(12) United States Patent
Barker et al.

(10) Patent No.: US 8,837,893 B2
(45) Date of Patent: Sep. 16, 2014

(54) EXCHANGE CABLING

(75) Inventors: Philip Alfred Barker, Ipswich (GB); John Kerry, Ipswich (GB); Christopher C. Taylor, Cheltenham (GB)

(73) Assignee: British Telecommunications public limited company, London (GB)

( * ) Notice: Subject to any disclaimer, the term of this patent is extended or adjusted under 35 U.S.C. 154(b) by 257 days.

(21) Appl. No.: 11/771,407

(22) Filed: Jun. 29, 2007

(65) Prior Publication Data
US 2008/0013884 A1 Jan. 17, 2008

Related U.S. Application Data

(62) Division of application No. 10/550,794, filed as application No. PCT/GB2004/001370 on Mar. 31, 2004, now abandoned.

(30) Foreign Application Priority Data

Mar. 31, 2003 (GB) .................................. 0307394.7
Sep. 25, 2003 (GB) .................................. 0322490.4

(51) Int. Cl.
*G02B 6/00* (2006.01)

(52) U.S. Cl.
USPC ........................................................ 385/135

(58) Field of Classification Search
USPC .................................................. 385/134, 135
See application file for complete search history.

(56) References Cited

U.S. PATENT DOCUMENTS

| 4,796,970 | A |   | 1/1989 | Reeve et al. |
|-----------|---|---|--------|--------------|
| 5,231,687 | A |   | 7/1993 | Handley |
| 5,535,298 | A | * | 7/1996 | Fasnacht et al. ............... 385/135 |
| 5,557,703 | A |   | 9/1996 | Barker et al. |
| 5,717,810 | A |   | 2/1998 | Wheeler |
| 6,363,198 | B1 |  | 3/2002 | Braga et al. |
| 6,764,221 | B1 | * | 7/2004 | de Jong et al. .................. 385/55 |
| 2007/0014526 | A1 | * | 1/2007 | Lazo ............................ 385/134 |

FOREIGN PATENT DOCUMENTS

| DE | 101 13 528 | 9/2002 |
|----|------------|--------|
| EP | 0 108 590  | 5/1984 |
| EP | 0350 245   | 1/1990 |
| EP | 0463749 A2 | 1/1992 |

(Continued)

OTHER PUBLICATIONS

English-language translation of Office Action issued in corresponding Chinese Application No. 200480008903.9 on Sep. 14, 2007.

(Continued)

*Primary Examiner* — Uyen Chau N Le
*Assistant Examiner* — Hoang Tran
(74) *Attorney, Agent, or Firm* — Nixon & Vanderhye P.C.

(57) ABSTRACT

A telecommunication distribution frame is provided for optical fiber of an incoming cable. Primary and secondary flexibility suites include joined blown fiber tubes routed as desired within the installation. A continuous blown fiber unit may extend through the joined blown fiber tubes. A blown fiber tube flexibility module may have a patching panel which may be provided with connectors. Above the panel may be a set of bend control vanes or mandrels one for each of the connector sites in the panel. Patching tubes may pass down and out through an aperture at the back of the module.

24 Claims, 21 Drawing Sheets

(56) References Cited

FOREIGN PATENT DOCUMENTS

| EP | 0697610 A1 | 2/1996 |
| JP | 2002-22974 | 1/2002 |
| JP | 2003-215352 | 7/2003 |
| WO | WO 95/20175 | 7/1995 |
| WO | WO96/24081 | 8/1996 |
| WO | WO 00/54087 | 9/2000 |
| WO | WO02/057833 | 7/2002 |

OTHER PUBLICATIONS

British Search Reports for GB 0407334.2 dated Aug. 19, 2004 and Oct. 18, 2004.
British Search Report for GB 0307394.7 dated Jul. 25, 2003.
International Search Report for PCT/GB2004/001370 dated Aug. 4, 2004.
(Parent) U.S. Appl. No. 10/550,794, filed Sep. 22, 2005.
English language translation of Office Action dated Sep. 29, 2009 in JP application No. 2006-506054.

* cited by examiner

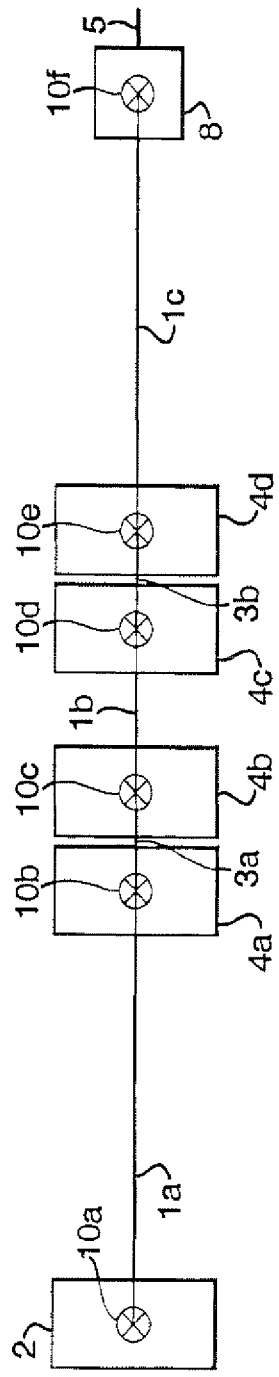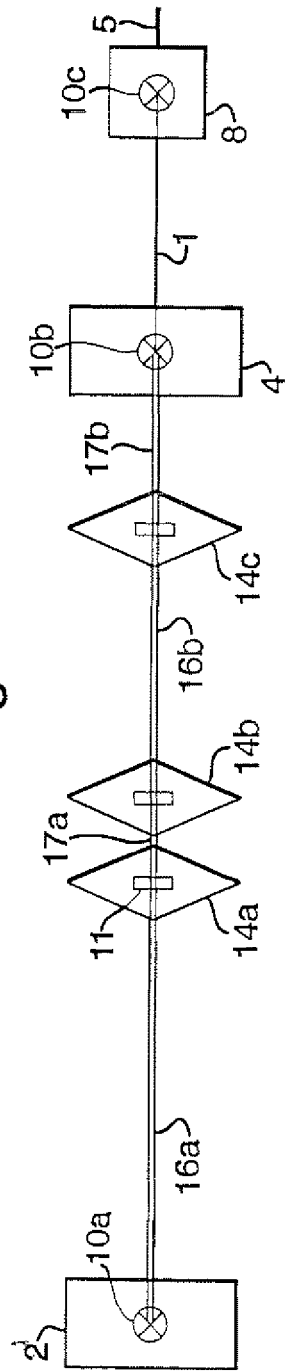

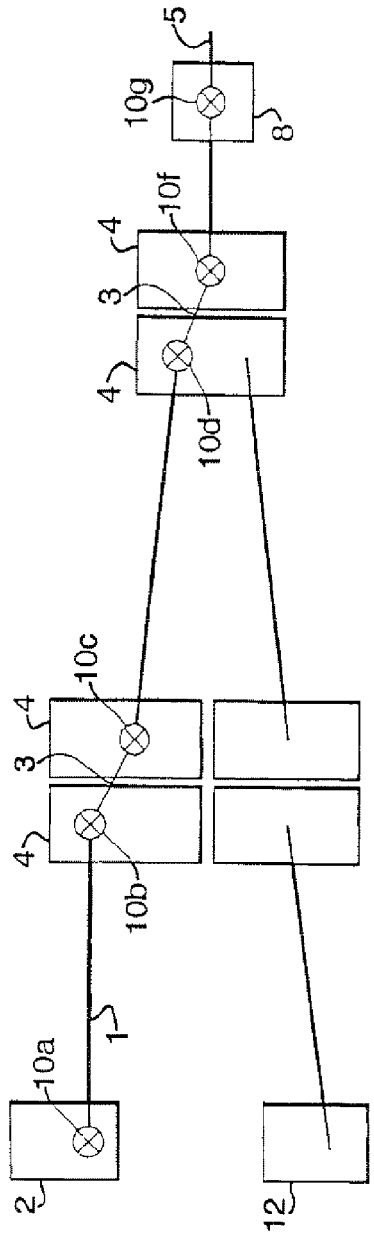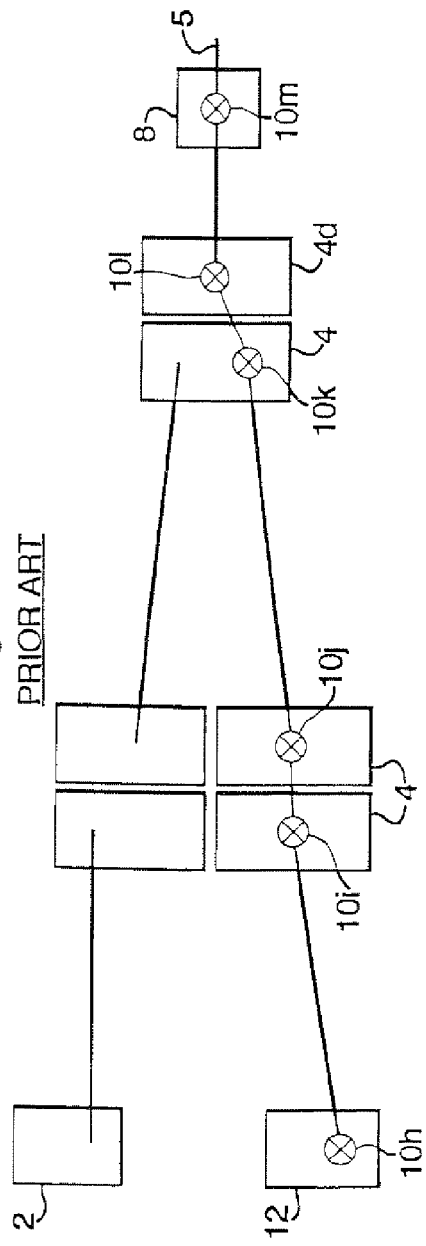

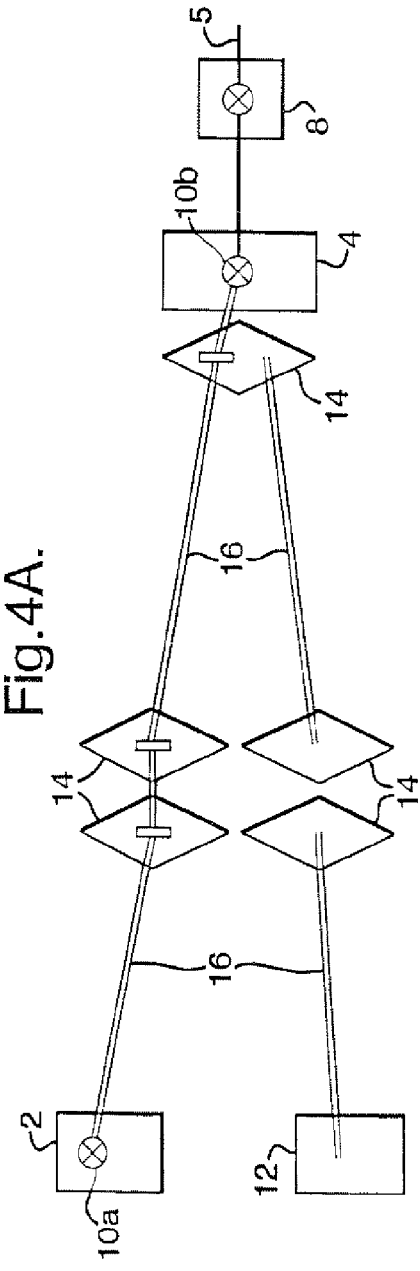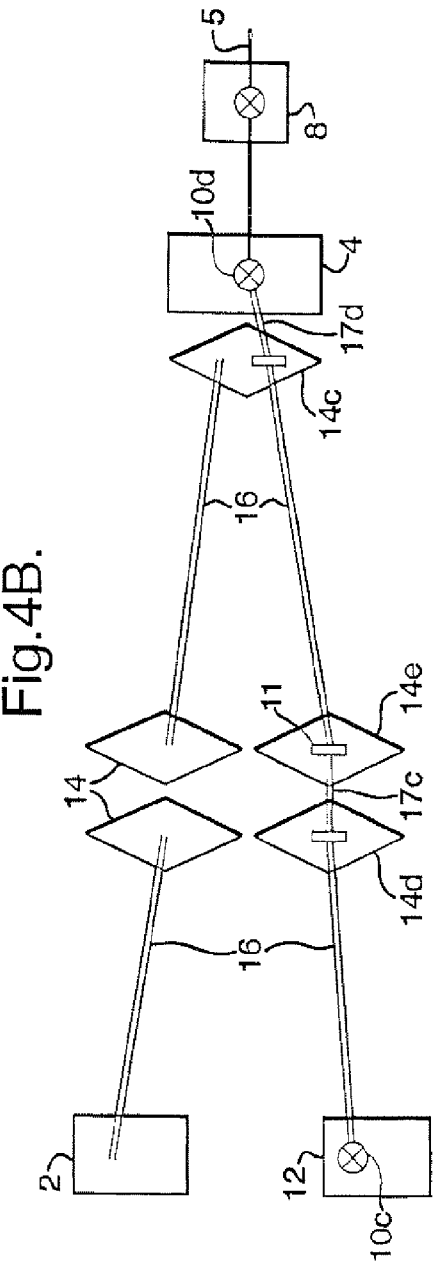

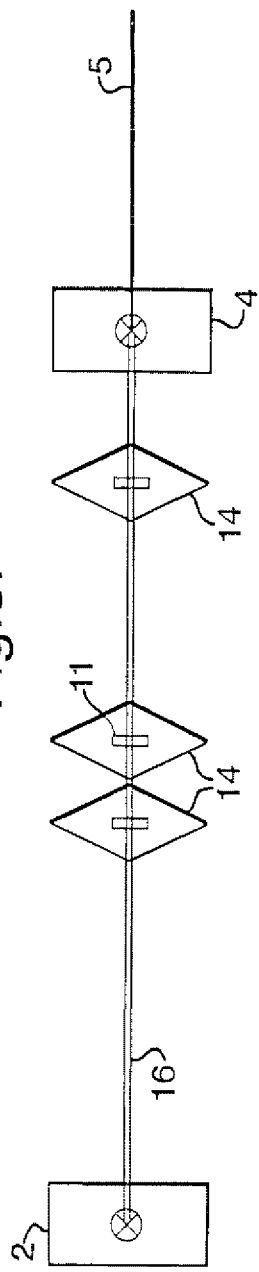
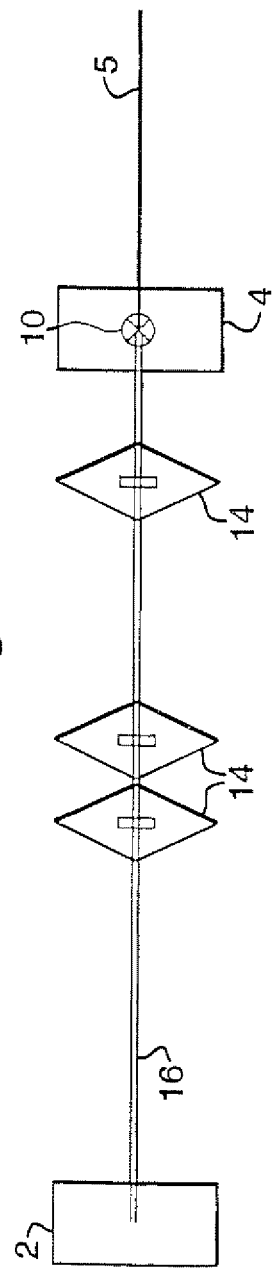

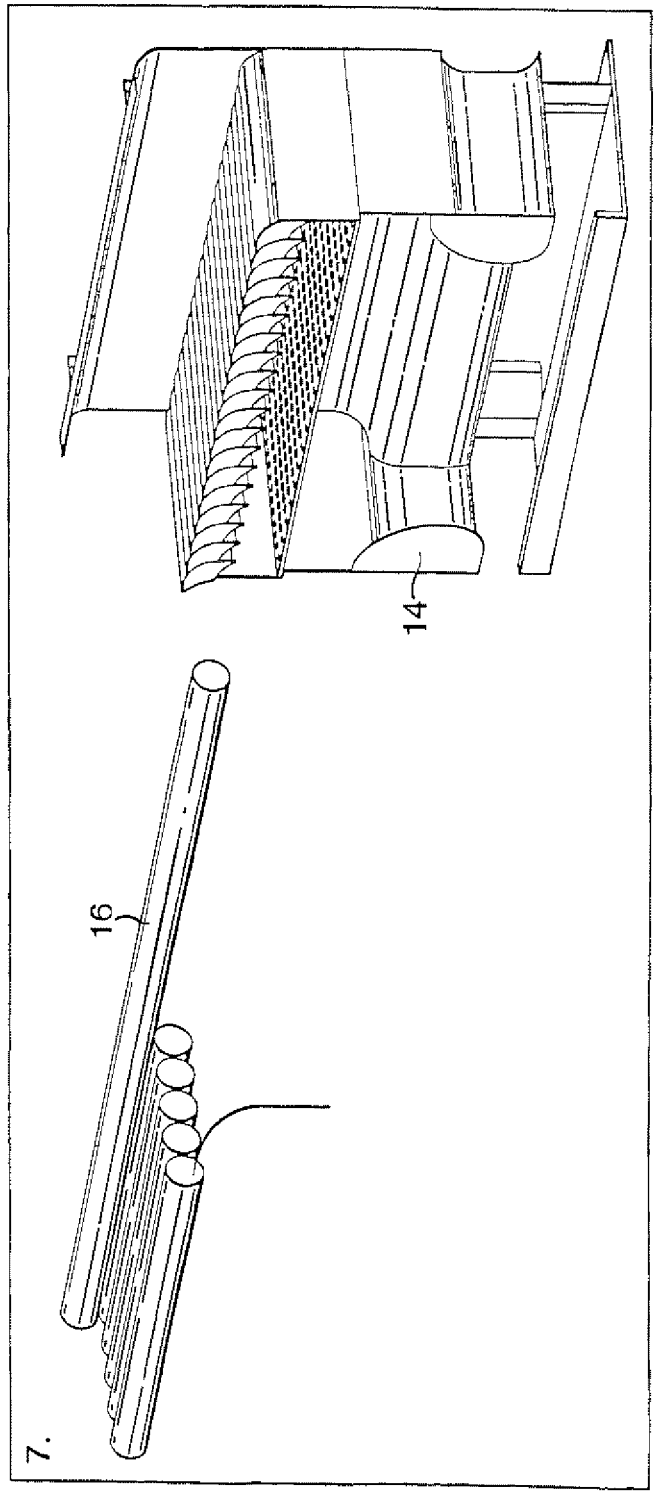

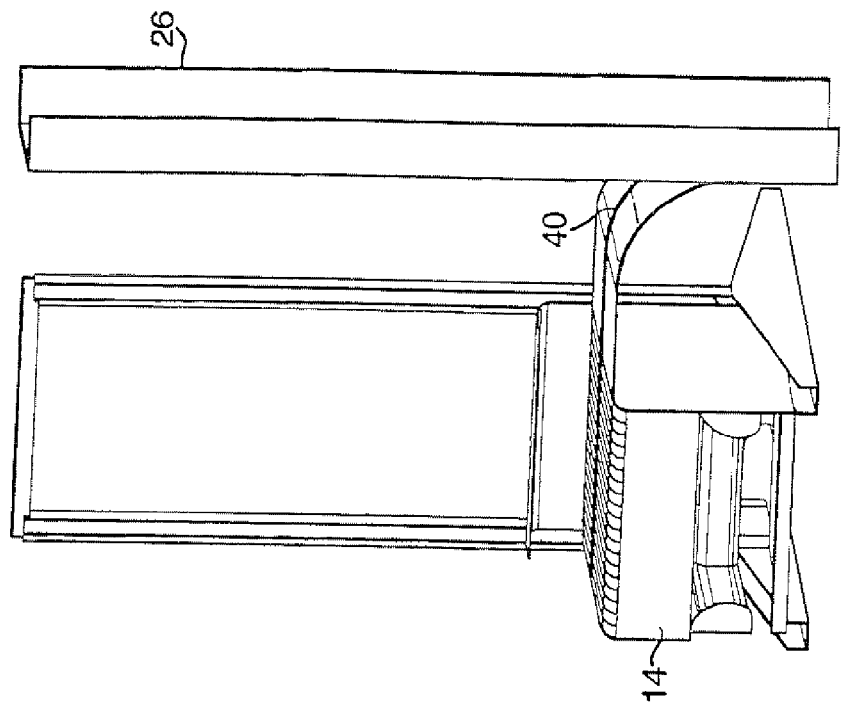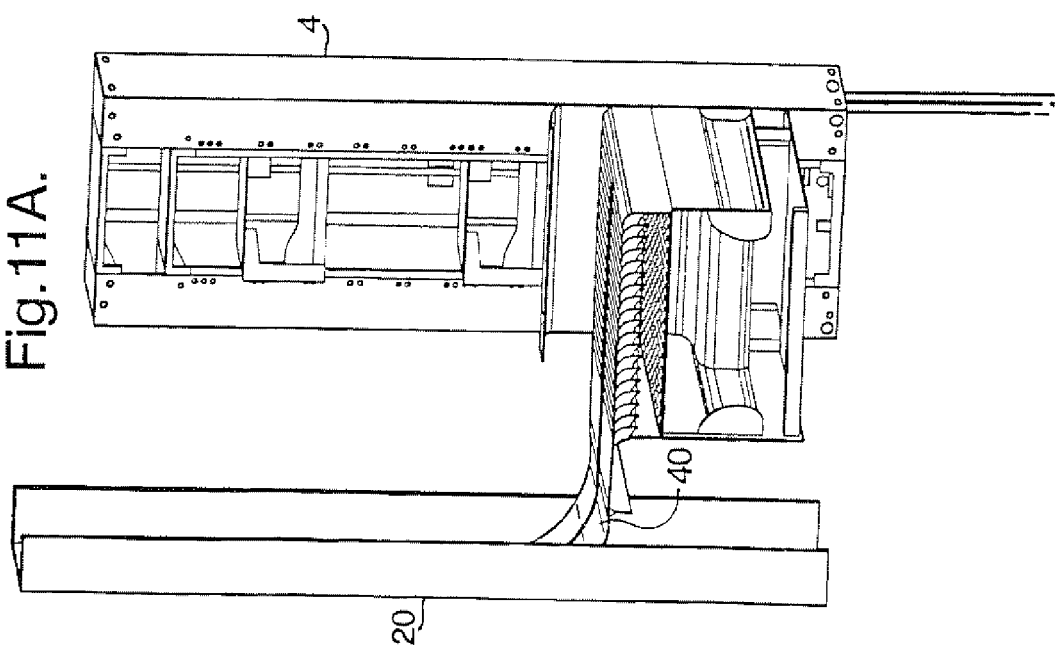

EXCHANGE CABLING

This application is a division of Ser. No. 10/550,794 filed Sep. 22, 2005 which is the US national phase of international application PCT/GB2004/001370 filed 31 Mar. 2004 which designated the U.S. and claims benefit of GB/0307394.7, dated 31 Mar. 2003 and GB 0322490.4, dated 25 Sep. 2003, the entire content of which is hereby incorporated by reference.

BACKGROUND

1. Technical Field

This invention relates to telecommunications exchange or router installations and to methods of creating connections and re-routing connections in such installations.

2. Related Art

A typical telecommunications exchange building houses a large variety and quantity of equipment such as switches, typically on equipment racks, and connected by cables to and from each other and to the external telecommunications network. The trunk parts of telecommunications networks are nowadays commonly all-fibre. Increasingly, optical fibre use extends into the access network, with fibre-to-the kerb, fibre-to-the-cabinet and even fibre-to-the premises. Consequently, virtually all modern telephone exchange installations involve a considerable proportion of fibre circuits rather than wired circuits. Because optical fibre is sensitive both to bend and strain, management of the optical interconnections within an exchange installation is important.

One of the main functions of optical fibre plant within an exchange or router building is to manage and route fibres from a particular set of optical equipment to fibres from, for example, an incoming cable from the external telecommunications network. As optical fibre is deployed more abundantly and more generally in the network, the routing and patching of such fibre, especially within exchanges, is becoming increasingly troublesome. Major problems are the growth in the amount of equipment and the sheer number of connections required. These problems are exacerbated by growth, upgrading and changes within the exchange which result in the need to interconnect new equipment or systems. Although the physical positions of incoming cables rarely change, additional cables may be added and the new equipment or system will almost certainly be in a different physical location from the old, and in any event will typically need moving or different connections to be made.

The current method of fibre routing within exchange buildings is achieved with Optical Flexibility Racks (OFRs), which serve as junction or distribution points allowing cables to be routed within the exchange building. OFRs can carry hundreds of individually spliced fibres but when they are fully populated, as is often the case, there is severe congestion at the OFRs. It is often difficult to identify, locate and isolate individual fibres in such cases when re-routing of the cable path is necessary, making the task both time-consuming and complicated. Another problem resulting from fibre overcrowding is that fibres are routed across each other in close proximity so that the combined weight presses down on fibres located near the base of OFRs, increasing the risk of circuit failure through increased optical loss and even of fibre breakage. This problem becomes even more critical as higher bit rate systems are employed, as these tend to be more sensitive to increases in optical loss.

The installation and maintenance of optical fibre cabling, its routing and supporting structures such as OFRs take up a significant portion of the total cost, time and effort of installing and cabling a telecommunications exchange system. The current methods to interconnect exchange equipment, or to connect an incoming cable to a rack of exchange equipment typically involve several lengths of optical fibre connected end to end either by means of connectors or splices, or a combination thereof. The path taken by the fibre from the incoming cable to an equipment rack could involve a significant number of connections or splices, especially if the destination equipment rack is physically distant from the incoming cable, for example if the equipment sits on a separate floor from the incoming cable within the exchange building.

Such conventional methods are commonly known and described in e.g. Modular Optical Plant for Access Network, Operational Aspects by D. Brewer et. al (Proc. EFOC & N (Technology and Infrastructure) 1995, at pages 164-167).

Problems associated with the existing method of creating fibre paths by using connectors or splices arise from the inherently delicate nature of joining fibre ends, which is time- and cost-consuming in the need for specialist equipment and expertise. Connections and splicing also inevitably involve optical losses regardless of the quality of the joint. Other problems could arise: for example, stored fibre could "run out" either side of the splice, thereby reducing the number of fibre turns and hence the opportunity to re-splice in the future.

BRIEF SUMMARY

In a first aspect, the present invention provides a flexibility suite for routing optical fibres within a telecommunications switch installation, the suite comprising:

a first flexibility point and a second flexibility point, the first flexibility point including a first set of conduits each of the conduits having a first end disposed in a first array and a second end disposed in a second array;

the second flexibility point including a second set of conduits, each of the conduits having a first end disposed in a third array and a second end disposed in a fourth array; the flexibility suite being so arranged as to permit the conduit ends on the second array to be interconnected with conduit ends on the third array by means of tubular interconnects so that, by selecting the conduits whose ends on the second and third arrays are interconnected, a continuous path can be formed between any conduit end in the first array and any conduit end in the fourth array.

Such an arrangement facilitates the use of blown fibre in an exchange setting. This arrangement also facilitates the provision of new paths through the re-use of existing partial paths simply by changing the choice of "patches" made between the second and third arrays.

Generally, the second set of conduits will be formed by the bores of double-ended connectors. Similarly, the first set of conduits will often be formed by the bores of double-ended connectors. Preferably the connectors are push-fit connectors which provide a sealing grip about or within the tubes which are used between flexibility suites, to switches or routers and as patch tubes. Such connectors are particularly good at facilitating the rapid commissioning or re-commissioning of tube paths.

In a second aspect, the present invention provides a telecommunications switch or router installation comprising; a telecommunications switch or router connected to an optical fibre of an optical fibre cable which itself is connected to and incoming from an external telecommunications network; a first and at least one second flexibility suite according to the first aspect of the invention; a sub-path being defined through each of the flexibility suites from the first array to the fourth array via an interconnection between the second and third arrays; the fourth array of the first flexibility suite being interconnected with the first array of the or one of the second flexibility suite(s), a tubular pathway being provided between the fourth array of the second flexibility suite or the last of the second flexibility suites and the switch or router; the other second flexibility suites, if any, being interconnected in series with the first array of each of subsequent second flexibility suite being interconnected with the fourth array of the preceding second flexibility suite by means of a tubular interconnect, so that a substantially continuous path is provided for installation of a blown-fibre member between the first flexibility suite and the switch or router.

In a third aspect the invention provides a method of creating a connection in a telecommunications switch installation, between a telecommunications switch, and an optical fibre of an incoming cable connected to and incoming from a telecommunications network, terminated at a primary flexibility suite, comprising the steps of:

installing lengths of blown fibre tube and joining the ends of the lengths of blown fibre tube to form a path from the primary flexibility suite to the telecommunications switch via a secondary flexibility suite, where the primary and secondary flexibility suites include means for routing joined blown fibre tubes within the installation, and thereafter, installing, by blowing, a continuous blown fibre unit through the path formed by the joined blown fibre tubes, thereby providing an optical path between the telecommunications switch and the optical fibre of the incoming cable.

In a fourth aspect, the present invention provides a method of re-routing an existing connection in a telecommunications switch installation from a connection between a first telecommunications switch and a primary flexibility suite, to create a connection between a second telecommunications switch and the primary flexibility suite comprising the steps of:

breaking the a connection between the first telecommunications switch and the primary flexibility suite at the primary flexibility suite, installing lengths of blown fibre tube and joining the ends of the lengths of blown fibre tube to form a path from the primary flexibility suite to the secondary telecommunications switch via a secondary flexibility suite, where the primary and secondary flexibility suites include means for routing joined blown fibre tubes within the installation, and thereafter, installing, by blowing, a continuous blown fibre unit through the path formed by the joined blown fibre tubes thereby providing an optical path between the second telecommunications switch and the optical fibre of the incoming cable.

BRIEF DESCRIPTION OF THE DRAWINGS

Embodiments of the invention will now be described by way of example only with reference to the accompanying drawings in which;

FIG. 1 is a schematic drawing of a exchange installation using optical fibre cables currently deployed according to the current conventional method;

FIGS. 2A and 2B are schematic drawings showing the existing method of re-routing the path between an incoming cable and the destination equipment rack using optical fibre cables according to the current conventional method;

FIG. 3 is a schematic drawing of an exchange installation according to the present invention;

FIGS. 4A and 4B are schematic drawings showing a method of re-routing the path between an incoming cable and the destination equipment rack according to the present invention;

FIG. 5 is a schematic drawing of another embodiment of an exchange installation according to the present invention;

FIG. 6 is a schematic drawing of a further embodiment of an exchange installation according to the present invention;

FIGS. 9A-I shows a typical build sequence of an exchange installation of the type as shown in FIG. 3 above;

FIGS. 11A to 11D illustrate the use of positive tube bend management in the BFTFMs;

DETAILED DESCRIPTION OF EXEMPLARY EMBODIMENTS

Figure 8A:
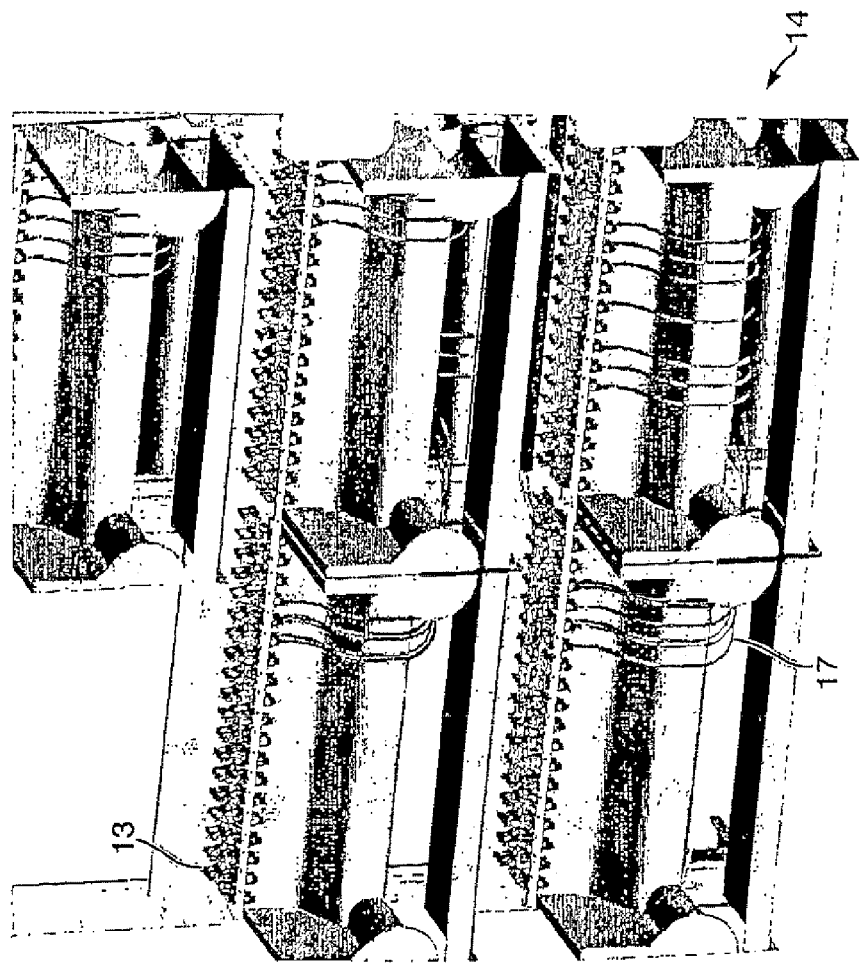
FIGS. 8A and 8B depict a suite of BFTFMs of the type shown in FIG. 7 partly populated with blown fibre tubes, and a view of the routes taken by the patching tubes within and between the BFTFMs.

The drawing in FIG. 8A depicts another view of a suite of BFTFMs (14) partly populated with blown fibre patch tubes (17). This is a three-high build of line-side and equipment-side modules. As described elsewhere, the BFTFMs perform a junctioning or distribution function to allow users to make connections between points in an exchange. The BFTFMs include a patch panel (11) comprising patching tube connectors (13). In this embodiment, the ends of the patch tubes are push-fit into the receivers to define connection paths. In a preferred embodiment, the patching panel comprises 19 tube connectors across and 14 deep in a grid or matrix formation or array.

FIG. 1 shows a typical layout of the current exchange installation of a particular equipment rack (2) within an exchange building, connected to an incoming cable (5). For the avoidance of doubt, an "incoming cable" includes any cable which enters the exchange to connect it with, for example external telecommunications networks.

The incoming cable (5) is typically terminated at a cable chamber joint (CCJ) (8) by a splice (10f) to an internal cable (1c). The CCJ is typically located within same building as the equipment rack (2) although this is not necessarily the case. The CCJ represents the "line-side" of the exchange for purposes of fibre routing within the exchange. The equipment rack represents the "equipment-side" for purposes of fibre routing within the exchange.

The internal cable (1c) is spliced at one end to the incoming cable at the CCJ, and the other end to a line-side flexibility point such as an Optical Flexibility Rack (OFR) (4d).

Flexibility points serve various functions, mainly as a junction or distribution point to allow a user to select and connect a point to any other point within the exchange e.g. from any piece of exchange equipment to any other piece of equipment, or from/to an incoming cable. Flexibility points also provide an interface between the typically high fibre count incoming cable and internal cables (which may be single-fibre or may contain many fibres), terminate incoming fibres onto splice trays for safe storage, provide easy access to each individual fibre and serve as testing points. We are however for present purposes interested only in their ability to connect line-side fibre to equipment-side fibre. Typically, at least two flexibility points are used together, more usually in side-by-side pairs, to facilitate the routing of fibres within the exchange—one on the line-side and one on the equipment-side. Such groupings of flexibility points are within this patent called flexibility suites. For the avoidance of doubt, "flexibility points" and "flexibility suites" in this discussion are generic references to OFRs and OFR suites for fibre cables, and to Blown Fibre Tube Flexibility Modules (BFTFMs) and BFTFM suites (discussed below in connection with FIG. 3 onwards).

OFR suites (4a and 4b, 4c and 4d) allow fibres terminated in line-side flexibility points and equipment-side flexibility points to be spliced to each other on a splice tray dedicated to a fibre or pair of fibres. Fibre jumpers (3a, 3b) are spliced between the pair of OFRs which typically make up a suite. Another fibre cable (1b) connects an equipment-side OFR (4c) to the next line-side OFR (4b). The first OFR suite (comprising 4c and 4d) in FIG. 1 is located near the CCJ, and the last suite (comprising 4a and 4b) is that located near the destination equipment rack. In an actual exchange, a number of OFR suites distribute and route optical cable; the "last OFR suite" (comprising 4a and 4b) would be the suite located closest to the destination equipment rack (2).

The prior art shown FIG. 1 depicts the most basic layout involving two pairs of OFRs (i.e. two suites). In practice, depending on the exchange building layout and the complexity and length of the optical path, any number of OFR suites can be used to describe the optical path to the equipment rack, which would have an effect on the number of splices or connections in the optical path. For the basic configuration shown in FIG. 1, a minimum of six splices (10a to 10f) is required.

FIGS. 2A and 2B illustrate how, according to current practices, an optical path is re-routed from a first equipment rack (2) to second equipment rack (12) in a conventional optical fibre installation.

In the installation shown in FIG. 2A, an optical path connects the incoming cable (5) to the existing equipment rack (2). There are six splices (10a to 10f) between the incoming cable (5) and the equipment rack (2). To re-route the optical path to the new equipment (12) at a different location, the splice at the OFR (10e) will have to be broken in the old path. The other splices along the old path (10a to 10d) could be broken if required. FIG. 2B shows the optical path to the new equipment rack (12) through two OFR suites (4). Five new splices (10h to 10l) are made to create the new optical path from the line side OFR (4d) adjacent to the CCJ (8). As discussed above, splicing is a time-consuming and hence expensive procedure requiring considerable specialist skill. Each splice will inevitably give rise to signal attenuation and the creation of new splices will necessarily involve the risk of a poorly-made joint in the optical path. The cable used in the old optical path may be removed and if not suitable for re-use, as is generally the case, it will be discarded. Alternatively it may be left in place, thus further adding to the problem of overcrowding within the exchange.

FIG. 3 shows a first embodiment of the invention. Instead of separate lengths of fibre connecting the OFRs which need to be joined (e.g. 1a, 3a, 1b, 3b and 1c in FIG. 1), a blown fibre unit (BFU) is installed from the OFR (4) to the equipment rack (2) to effect the connection between the incoming cable (5) and the equipment rack (2).

The incoming cable (5) is terminated at a first line-side OFR (4) in the usual way as described in connection with FIG. 1 above. An internal cable (1) is spliced to the incoming cable at the CCJ and will be spliced at its other end on a splice tray housed in a conventional line side OFR (4) in the usual way as described in connection with FIG. 1 above. From the line-side OFR (4), lengths of blown fibre tube (BFT) or bundles thereof (16) are patched through to the equipment rack (2) via a number of flexibility points for BFTs which we will refer to as Blown Fibre Tube Flexibility Modules (BFTFMs) (14). These BFTFMs typically comprise a single tube and push-fit BFT connectors. Suitable push-fit connectors can be obtained from the John Guest company. As noted above in connection with FIG. 1, BFTFMs are flexibility points allowing the production, within the exchange building, of a blown fibre installation path from any point to any other point by routing and joining lengths of blown fibre duct. As with OFRs, BFTFMs will most commonly be employed in pairs, or suites, one on the line-side (14b) and one on the equipment-side (14a). The OFR (4) at which the internal cable (1) is spliced forms one half of a flexibility suite, the other half of the suite being a BFTFM (14c) on the equipment side. We will refer to this flexibility suite as the primary flexibility suite. Within the blown fibre path between the primary flexibility suite and the switch/router there will be one or more other flexibility suites and these will be referred to as secondary flexibility suite(s).

As an alternative to the configuration of the primary flexibility suite described above, the primary flexibility suite could also comprise two BFTFMs (as opposed to an OFR and a BFTFM). The main function of the OFR in the primary flexibility suite is to receive the incoming cable (5), which could comprise up to e.g. 144 fibres, and provide a break out point for the individual fibres of that cable. It is possible for the individual fibres of the incoming cable to be broken out at, for example, a CCJ (8), or at any point between the CCJ and the primary flexibility suite. It would not however normally be desirable so to do, as this would mean bringing up to e.g. 144 individual fibres to the primary flexibility suite for treatment. For the purposes of this description therefore, the primary flexibility suite will be discussed as being an OFR-BFTFM pair although it should be understood that this is not the only arrangement possible.

The BFTs (16a, 16b) in this embodiment are installed between one equipment-side BFTFM to the next line-side BFTFM along the path to the equipment rack. The path is completed by installing BF patch tubes (17a, 17b) within the flexibility suites (14c and 4, 14a and 14b), so that a completed BFT path is created between the OFR (4) and the equipment rack, ready to receive a blown fibre unit (BFU). BFU is then installed by blowing from one or other end of the path, i.e. from the equipment rack (2) or from the first OFR (4).

In a preferred version of the invention, EPFU (Enhanced Performance Fibre Unit) as generally described in EP-B-052170 is used. The BFT or duct used as patch tubes typically has an internal bore diameter in the range 1.5 to 5 mm, more usually between 2.0 and 4 mm, especially 2.5 to 3.5 mm. A particularly preferred bore diameter is 2.5 mm, and a tube with this bore size can conveniently be made to have an outer diameter of 4 mm. Of course, the use of circular internal cross sections is not essential, nor is the use of circular external cross sections although these will often be used. Generally, the fibre unit to be used will contain only a single fibre, but there will be occasions where higher fibre counts will be used. Often fibre units can be made more stable if they contain an even number of fibres, for example 2-fibre, 4-fibre, 8-fibre, but odd-fibre counts can of course be used. The use of fibre units with multiple fibres may, for example, be useful where the multiple fibres are to be terminated at the same destination rack and/or where they serve the same customer.

FIG. 3 shows just two flexibility suites in use, but as discussed above, further flexibility suites can be employed depending on the physical distance, building layout and path taken from the originating point to the destination point.

By way of example, if the scenario involves the CCJ (8) being located in the basement, the primary flexibility suite (4) on the ground floor and the equipment rack (2) on the first floor, the installation could involve the following steps:

1. Install the CCJ (8).
2. Terminate the incoming cable (5) on the CCJ.
3. Install an internal cable (1) between the CCJ and the OFR of the primary flexibility suite (4)
4. At the CCJ splice all fibres from incoming cable (5) to the internal cable (1).
5. Terminate all the fibres from the internal cable (1) on the OFR (4).
6. Install BFT (16b) from the equipment side of the BFTFM (14c) in the primary flexibility suite to the line-side BFTFM (14b) on first floor.
7. Install BFT (16a) from the equipment rack (2) on the first floor to the equipment side of the first floor BFTFM (14a).
8. Patch the BFT path at the flexibility suites using BF patch tubes (17a, 17b), typically cut to length on site. "Patch tubes" are generally short lengths of tube to provide a "patch" between a BFT on the equipment side of the BFTFM to a BFT on the line side of the BFTFM.
9. Install the BFU. Blowing will usually be carried out from either the equipment rack (2) or from the OFR (4), although blowing out from some intermediate point may also be possible.
10. At the OFR splice the internal cable (1) to the installed BFU.
11. At the equipment rack splice the pigtails from the equipment rack (2) to the installed BFU (of course if the equipment pigtails are connectorised—i.e. have connectors, then it is useful for the BFU to be pre-connectorised, so that the connector(s) of the BFU(s) can be coupled to those of the pigtails).

It will be clear to the skilled person that a major advantage of using a single unbroken length of blown fibre unit to interconnect optical equipment to the external network, is the removal of lossy splices and/or connectors. Their removal also eliminates these known reliability weak points. In the basic arrangement described in this FIG. 3, there are only three splices (10a, 10b, 10c) per fibre between the CCJ and the equipment rack, compared to six in the conventional arrangement described in FIG. 1. Time- and cost-savings are achieved as expensive and delicate splicing and connectorising are significantly reduced.

FIGS. 4A and 4B show how an optical path connecting an incoming cable (5) to an existing equipment rack (2) can be changed to the new equipment rack (12) in accordance with the invention.

FIG. 4A shows the existing optical path between the incoming cable (5) and the old equipment rack (2) though two flexibility suites (14). FIG. 4B shows how only two splices (10a, 10b) have to be broken in the existing optical path, which compares favourably with equivalent under the conventional method which requires five breaks (see FIG. 2). After the splices are broken (or, more generally, the fibre cut) the blown fibre unit is removed. The path is then re-configured, using BFT (16) between flexibility suites (14d and 14e, 14c and 4), and single tube BFT patch leads (17c, 17d) between the flexibility points within a suite. BFU is then installed as described above in connection with FIG. 3, by blowing from one or other end of the path, i.e. from the new equipment rack (12) or from the OFR (4). Only two new splices are made (10c, 10d), at the OFR and the new equipment rack.

It can be seen that yet another advantage of the invention is flexibility in re-routing and user-friendliness, compared to conventional techniques requiring installation of heavy cables.

FIGS. 5 and 6 show refinements of the arrangements described in FIG. 3 above, being embodiments of the invention which further reduce the number of splices required.

In FIG. 5, the CCJ (8) and the splice thereat are removed. The incoming cable (5) is instead directly spliced to the blown fibre unit (when installed) at the line side OFR (4). In this arrangement, there are only two splices per fibre between the incoming cable and the switch/router. By way of example, the following are typical steps that can be taken to create this installation where the incoming cable enters the building in the basement, the primary flexibility suite (4) is on the ground floor and the equipment rack is located on the first floor:

1. Route the incoming cable (5) from cable chamber to the OFR of the primary flexibility suite (4).
2. Terminate all fibres of the incoming cable (5) on the OFR (4). Install BFT (16a) from the equipment side of the ground floor BFTFM (14c) of the primary flexibility suite to the line-side BFTFM (14b) on first floor.
3. Install BFT from the equipment rack (2) to the equipment side of the first floor BFTFM (14a).
4. Provide a BFT path through all BFTFMs using BF patch tubes (17a, 17b), typically cut to length on site.
5. Install BFU. Blowing will generally be carried out from either the equipment rack or from the first OFR.
6. At the OFR splice the incoming cable (5) to the installed BFU.
7. At the equipment rack splice pigtails from the equipment rack (2) to the installed BFU or, if connectorised, join the connectors of the BFU to those of the pigtails.

The arrangement in FIG. 6 allows a connection between the equipment rack (2) and the incoming cable (5) with just a single splice (10) at the OFR (4). In this case, BFT is installed directly from the equipment rack to the equipment side of the BFTFM located nearest to the equipment rack (14a). BFU is installed in the manner discussed above with reference to FIG. 3. By way of example, the following are typical steps that can be taken to create this installation where the incoming cable enters the building in the basement, the primary flexibility suite (4) is on the ground floor and the equipment rack is located on the first floor:

1. Route the incoming cable (5) from cable chamber to the OFR (4) of the primary flexibility suite.
2. Terminate all fibres of the incoming cable on the OFR (4).
3. Install BFT (16b) from the equipment side of ground floor BFTFM of the primary flexibility suite (14c) to the line-side BFTFM on first floor (14b).
4. Install BFT (16a) from the equipment rack (2) to the equipment side of the first floor BFTFM (14a).
5. Patch a BFT path through all BFTFMs using BF patch tubes (17a, 17b), usually cut to length on site.
6. Install pre-connectorised BFU by blowing from the equipment rack of the switch or router.
7. At the OFR splice the incoming cable (5) to the BFU.

Figure 7:
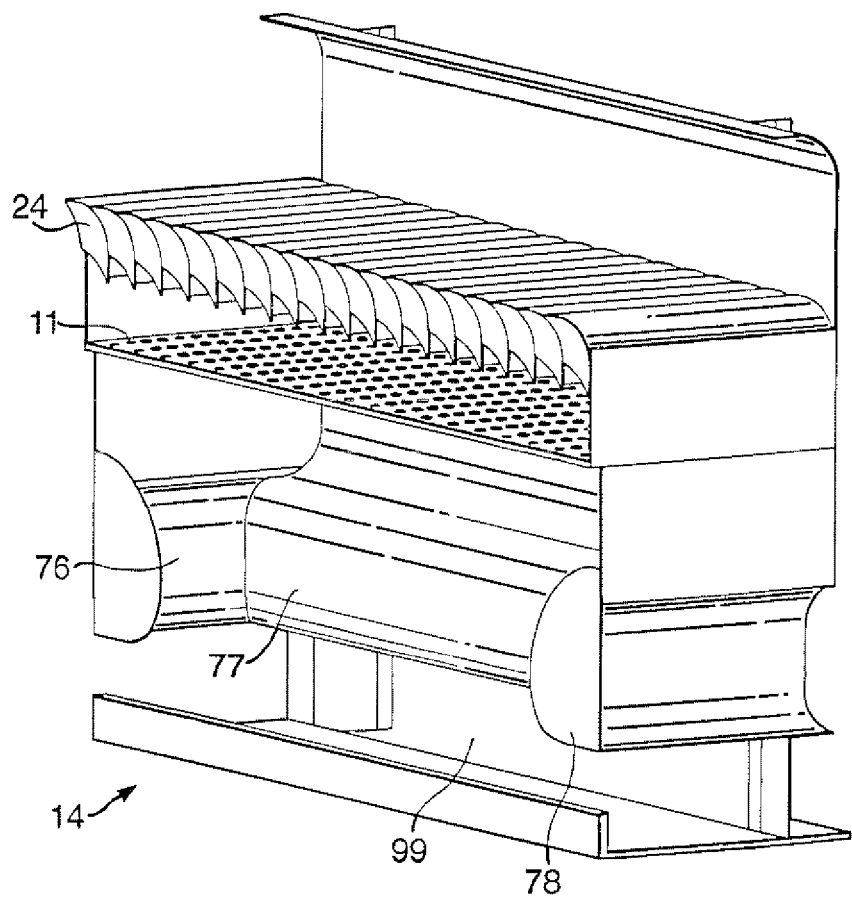
FIG. 7 shows a blown fibre flexibility tube module (BFTFM)

FIG. 7 shows an embodiment of a BFTFM (14). This has a patching panel (11), shown here with no connectors, although these would generally be provided, in double-ended form (as for example shown in FIG. 14), within each of the holes shown in the panel 11. Above the panel 11 are shown a set of bend control vanes or mandrels 24, one for each of the connector sites in the panel 11. It will be seen that these are configured to receive tubes which approach the BFTFM from the left, the tubes then being bent down to reach a connector site on the panel 11. These tubes could be the patching tubes or they could be tubes coming from an earlier suite or going to a later one. The other ends of the connectors, when fitted into the panel 11, face downwards and tubes (typically patching tubes) are mated to these connectors and then lead on to connectors of another BFTFM (typically the one that provides the other part of the same suite). The arrangement shown in FIG. 7 is intended to be used with a matching BFTFM as shown in FIG. 7B. In such an arrangement, the patching tubes typically pass down and out through the aperture 99 at the back of the BFTFM. The curved faces of the three-sided structure shown generally as 77 serves to provide a bending mandrel for the patch tubes that join the two BFTFM of the suite. The end portions 76 and 78 provide some lateral confinement of the patch tubes as well as providing another curved guiding mandrel. Preferably the bend management mandrels 24 are provided as a unitary structure to suit a particular size of patching panel. Also, it is preferable if the bend management mandrels or the assembly of these can be fitted in either hand, that is to accept tubes from left of the suite or from right of the suit. A bend mandrel arrangement or assembly could be provided to accept tubes both from the left and from the right (that is, in FIG. 7 the left hand part of assembly 24 could be as shown, while the right hand part could have the mandrels or vanes with a bend towards the right (e.g. the mirror-image of the left). Clearly, such an arrangement need not be symmetrical, with the left half of the mandrels bending left and the right half bending right, but could be arranged one-third two-thirds or one-fifth four-fifths, for example.

Preferably a BFTFM occupies about the same area and space as an existing OFR or other generic flexibility rack currently used in exchanges, for ease of replacement. In the UK in the exchanges of British Telecommunications pic therefore, it is anticipated that BFTFMs will be approximately 1000 cm wide, 400 cm deep and 830 cm tall. This build of BFTFMs is expected to be stacked up three modules high each on the line- and equipment sides, as shown in FIG. 7F, to occupy a total height of about 2500 cm. It is of course possible to size and configure the BFTFMs according to the particular requirements of the situation.

As noted briefly above, it is preferable that BFTFMs incorporate positive tube bend management (e.g. the mandrels 24) for optimised BFU installation. Further discussion of this technique is provided below in the discussion of FIGS. 10 and 11, but in brief this helps prevent installed optical fibres from being bent at less than their minimum permissible bend radius.

FIGS. 7A to 7F show possible build configurations of the BFTFM of FIG. 7 into BFTFM suites, from a single module to a six-module build. While a single BFTFM may be used as a flexibility point, multiple-modules are preferred (e.g. to provide one or more suites) and their modularity allows flexibility in use and scope for expansion.

Figure 7A:
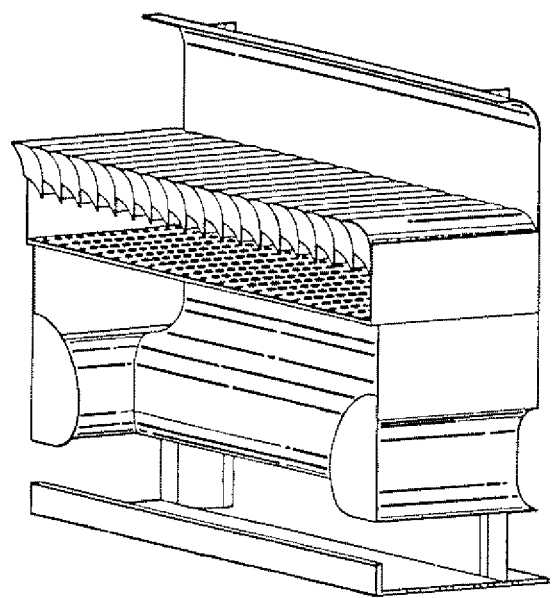
FIGS. 7A to 7F show configurations of BFTFMs in single-, two-, three-, four-, five- and six-module builds respectively.
Figure 7B:
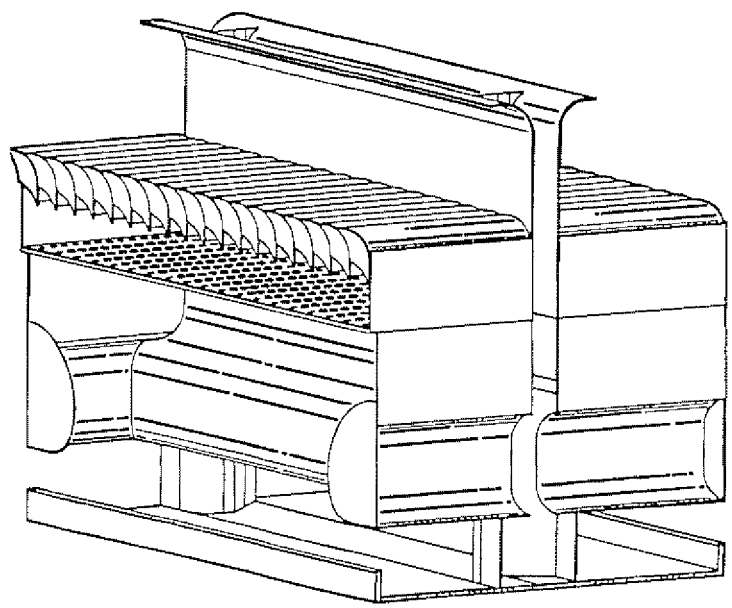
Figure 7D:
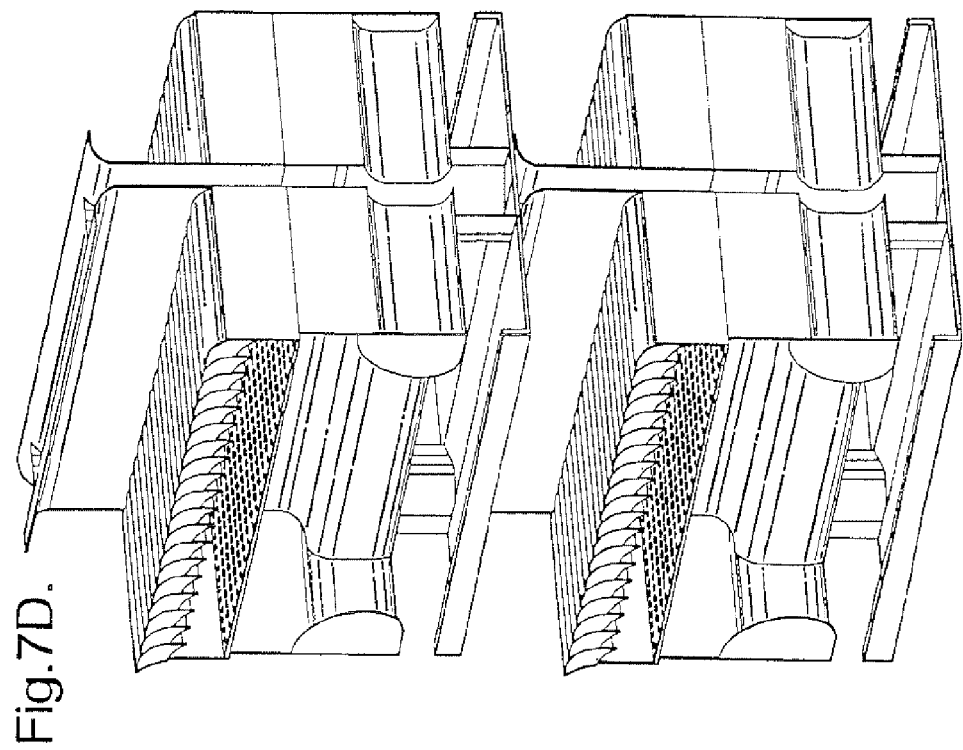

FIG. 7A shows a single module BFTFM. Two versions are available that respectively allow cable entry from left or right. The example shown allows cable to be fed from the left. A single unit like this would be mounted on the back of a flexibility point such as an OFR to provide the first building block of flexibility suite, in particular the suite most adjacent to the CCJ or the incoming cable.

FIG. 7B shows two BFTFM modules mounted back to back to create a flexibility suite with a line-side and an equipment-side. Generally, two modules are the optimum to provide line and equipment side flexibility.

Figure 7C:
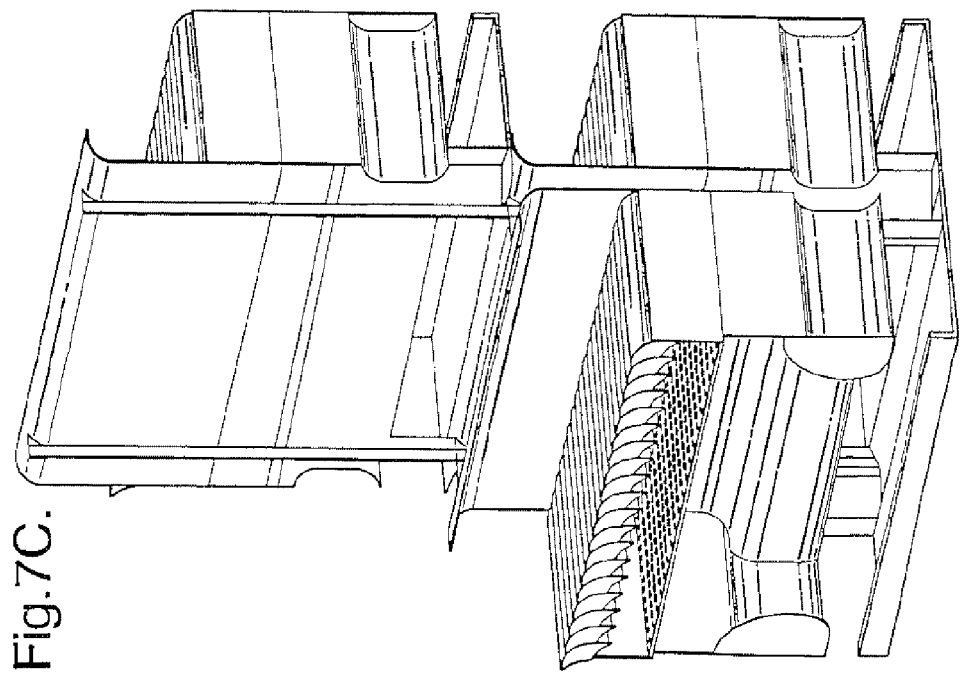

FIG. 7C shows a further BFTFM module mounted on top of the arrangement of FIG. 7B. Such an arrangement may be required for example, where there is uneven growth of the demand for the equipment-side modules, compared to that for line-side modules.

FIG. 7D shows that further build can also be carried out to the side from one end of the suite. In this case as cable entry is from the left-hand side, further modules would be added to the right.

Figure 7E:
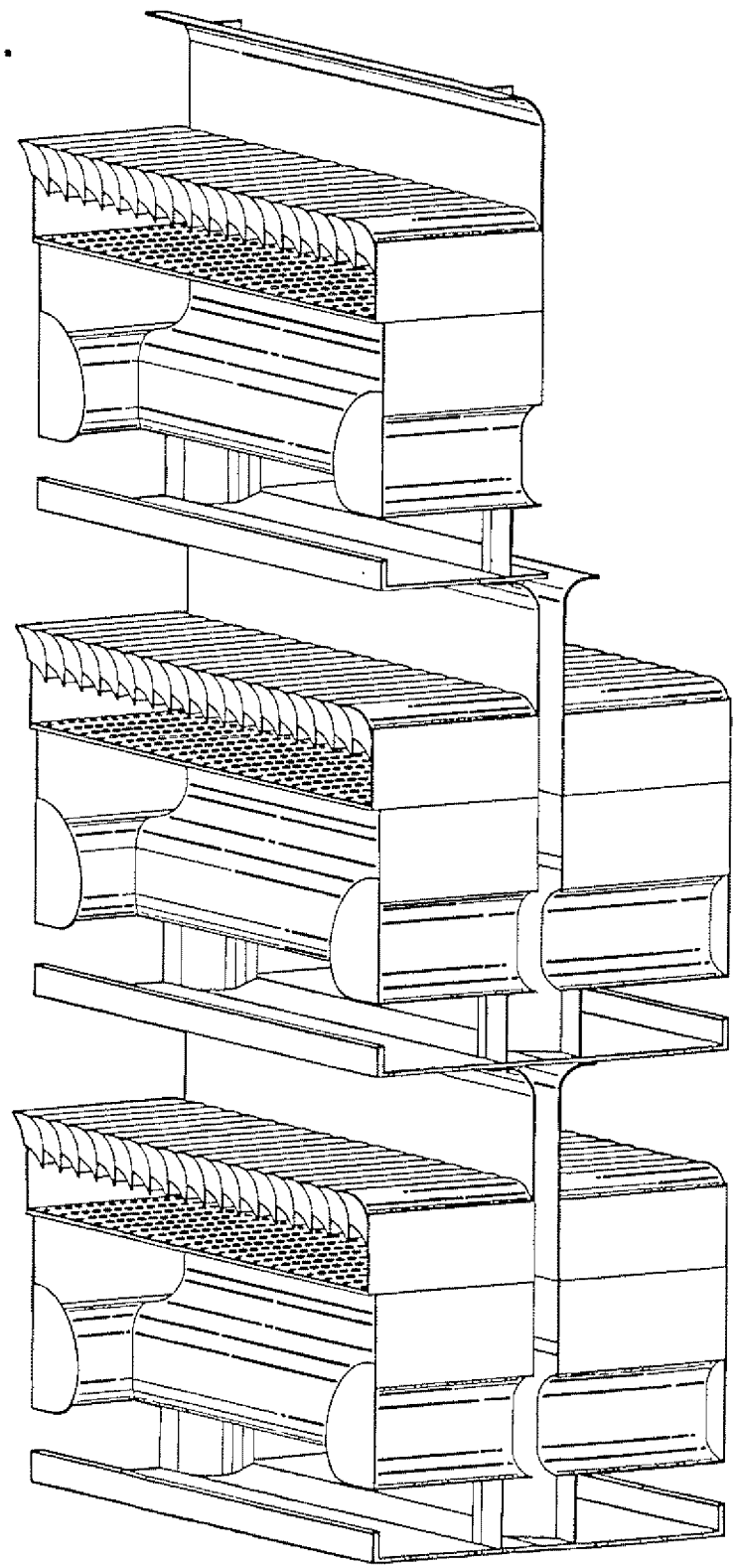
Figure 7F:
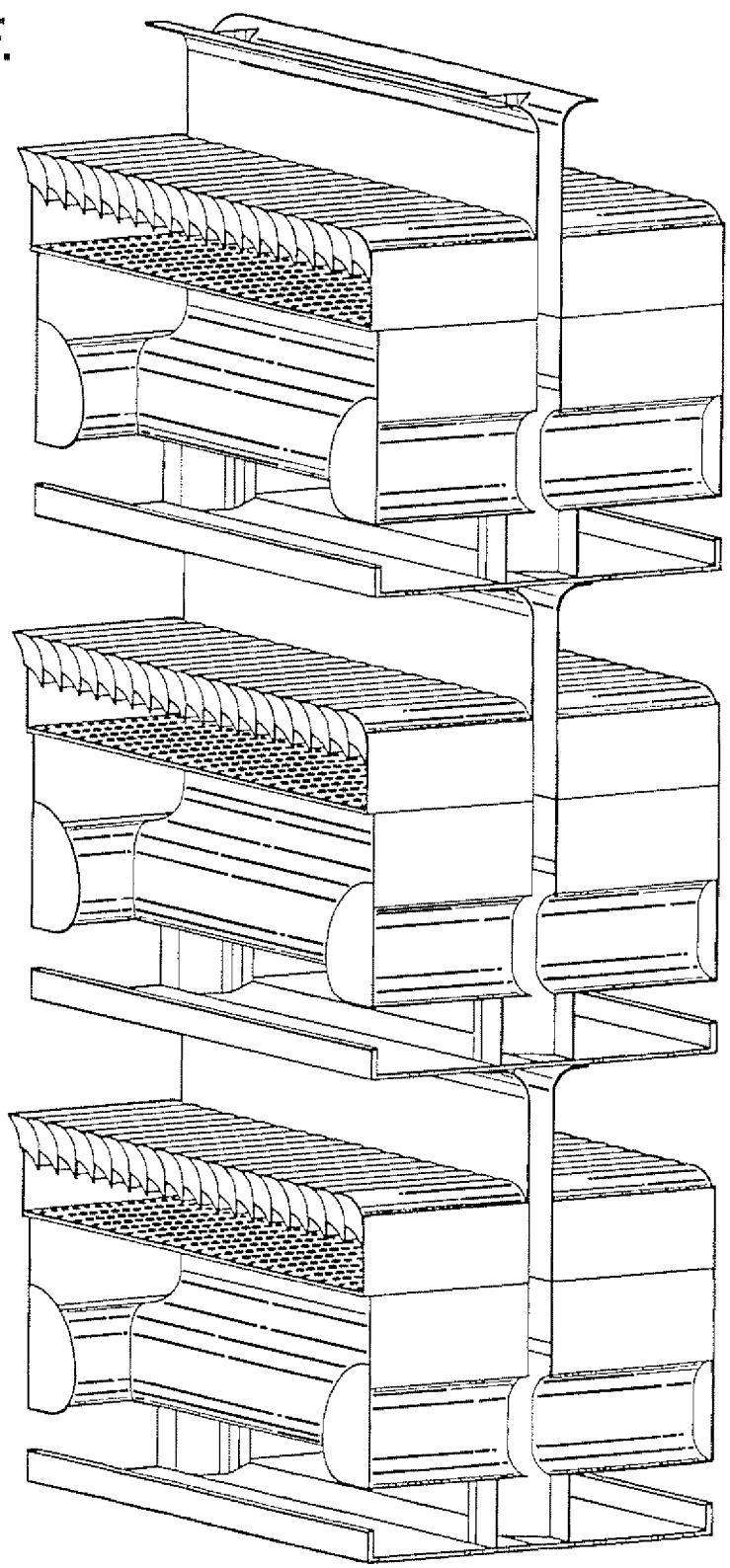

FIGS. 7E and 7F show five- and six-module configurations to illustrate the potential for growth in the use of BFTFMs.

The drawing on the right in FIG. 8 depicts another view of a suite of BFTFMs (14) partly populated with blown fibre patch tubes (17). This is a three-high build of line-side and equipment-side modules. As described elsewhere, the BFTFMs perform a junctioning or distribution function to allow users to make connections between points in an exchange. The BFTFMs include a patch panel (11) comprising patching tube connectors (13). In this embodiment, the ends of the patch tubes are push-fit into the receivers to define connection paths. In a preferred embodiment, the patching panel comprises 19 tube connectors across and 14 deep in a grid or matrix formation or array.

The patch panels of the pair of BFTFMs (such as 14*a* and 14*b* in FIG. 3) allow a user considerable scope and flexibility in directing and re-directing fibre connections within the exchange. After a tube path is created by push-fitting the tube ends into the relevant tube connector, fibre can then be blown along the path from source (e.g. an incoming cable 5) to destination (e.g. an equipment rack 2)—or in the opposite direction—via the BFTFM(s). The fibre connection can be easily removed and/or redirected by withdrawing the fibre from the tube path, pulling out the tubes from the tube connector in the relevant BFTFM, and then if required by repeating the above steps to create the path from the new source or to the new destination.

Figure 8B:
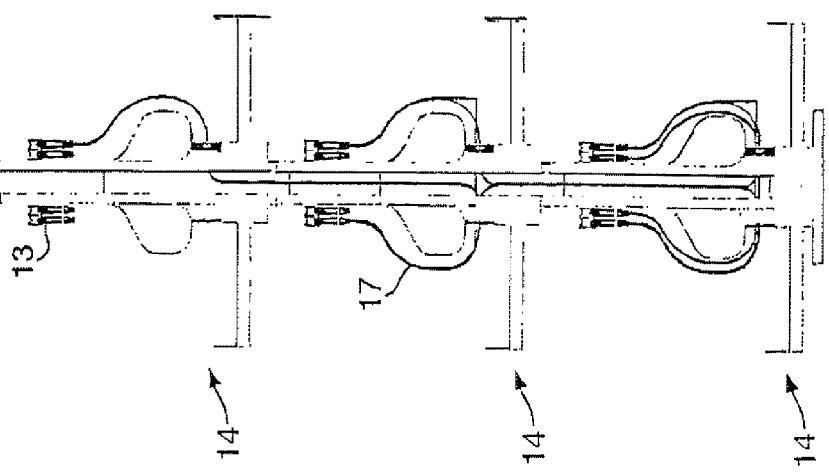
Figure 9B:
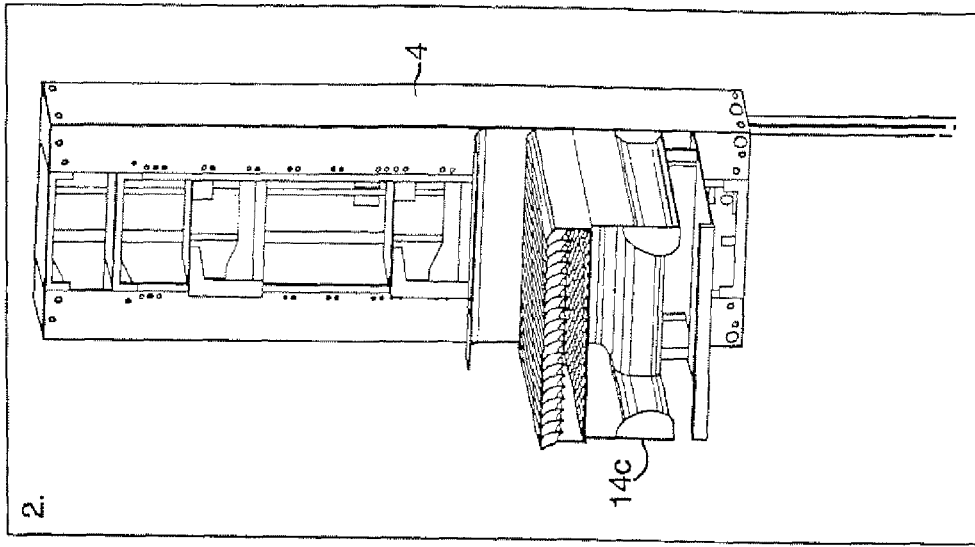
Figure 9A:
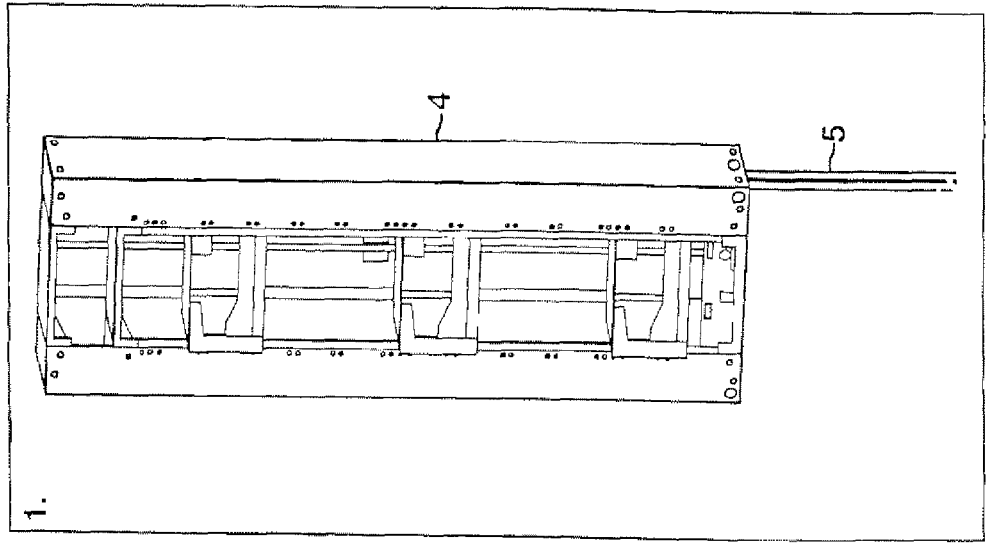
Figure 9D:
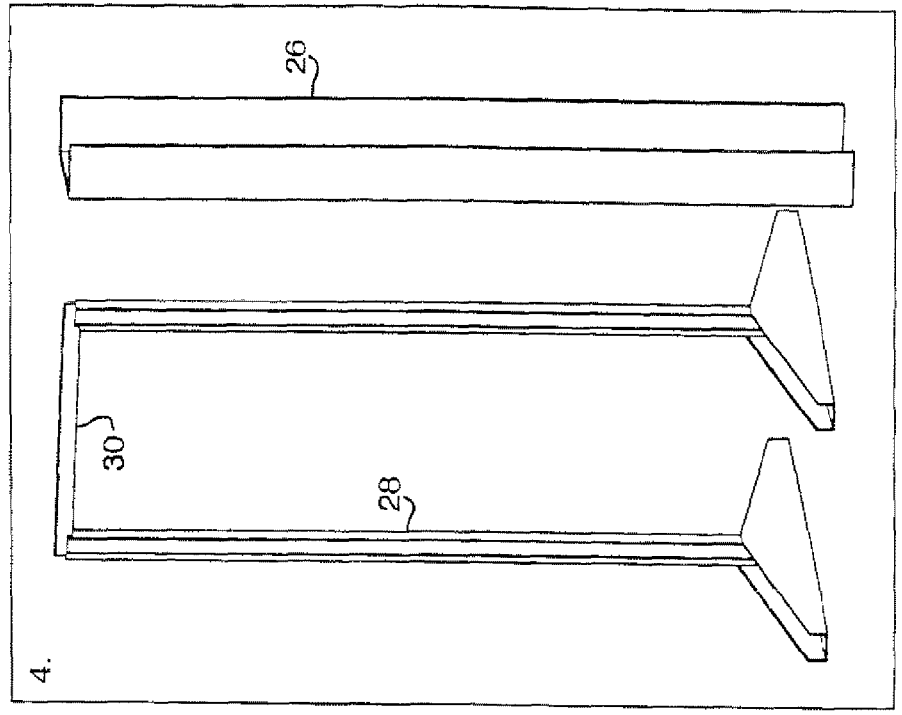
Figure 9C:
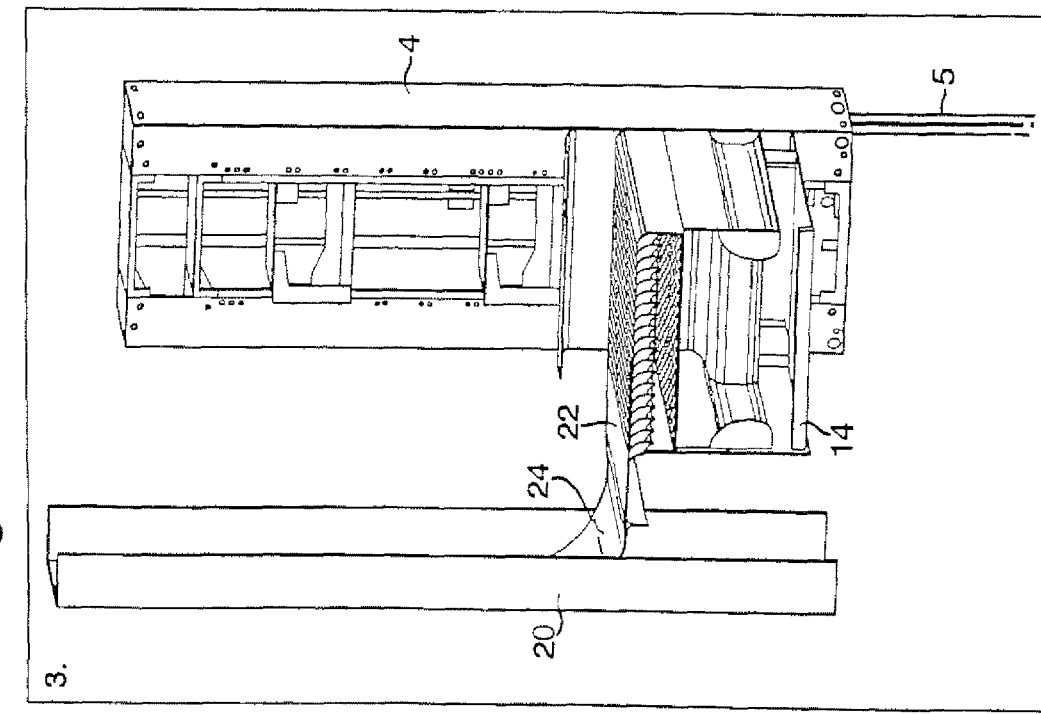
Figure 9F:
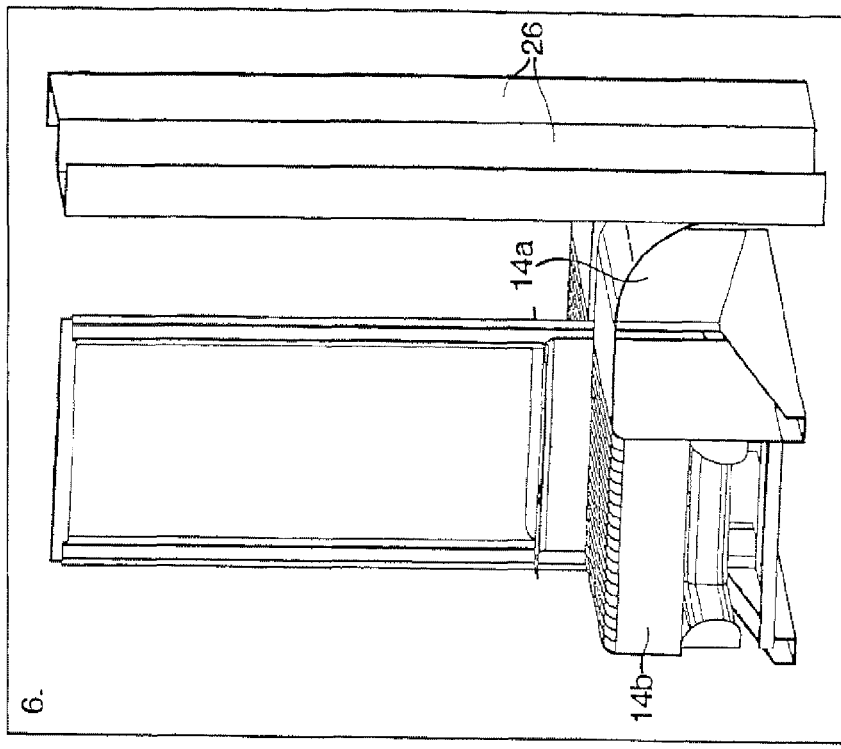
Figure 9E:
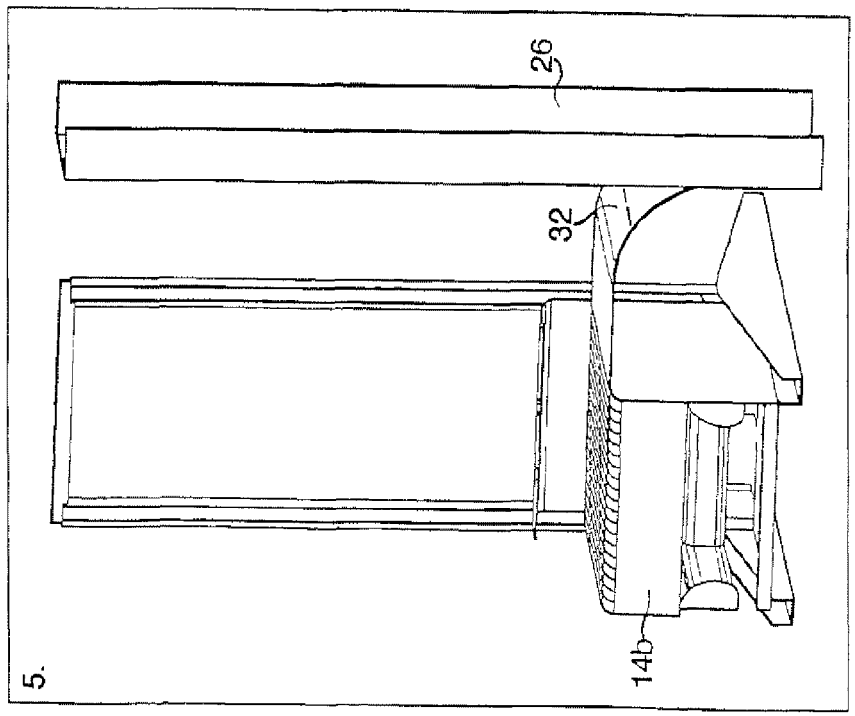
Figure 9I:
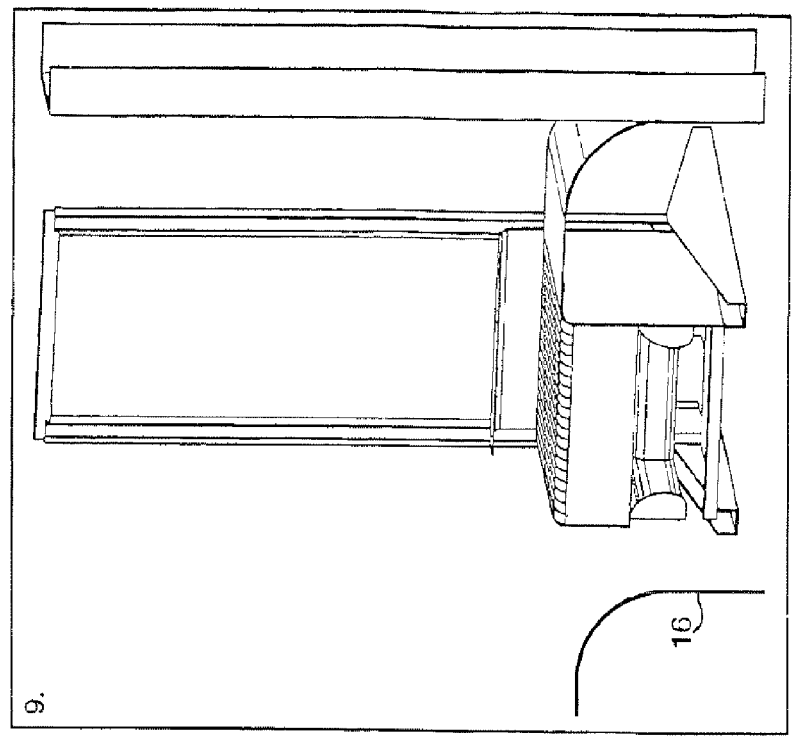
Figure 9H:
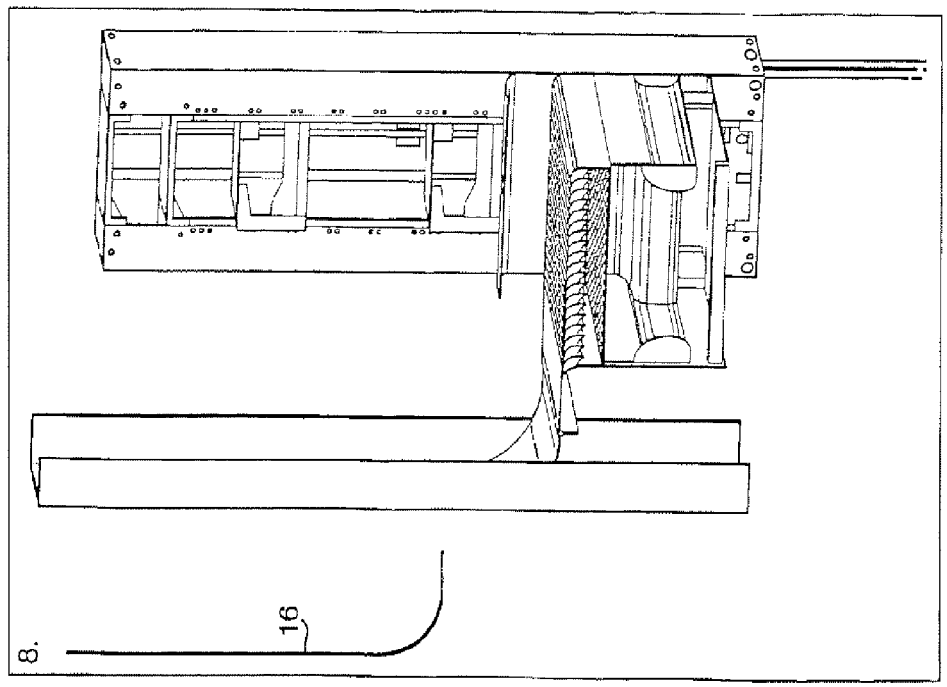

The schematic diagram in FIG. 8B shows the side view of the BFTFM suite (shown on the right of the same page and discussed above), with details of the tube patching between the patching panels located on each BFTFM. It can be seen that the patching tubes exit the connectors 13 downwards. In the suite on the lower level of the assembly, patch tube link the front and back (or, as shown, the left and right) of the suite. It can also be seen that the top right BFTFM has been interconnected with the middle-left BFTFM using a patching tube. Similarly, each of the middle tier of FBTFMs is connected to the lowest tier of the stack. Clearly the figure is merely illustrative and in general much higher densities of patch tube connection will be used in real life.

The paths of the patching tubes (17) can be traced between the different levels of BFTFMs in the figure.

FIG. 9 shows a typical build sequence for the installation described in FIG. 6 above using a generic type of OFR. The following steps accord with the numbering against the drawings:

Installing the Primary Flexibility Suite (4 and 14*c* of FIG. 3)
 1. Install the OFR (the rear covers have been removed in the drawing for clarity) (4). Install the incoming cables (5) and terminate their fibres on splice trays, preferably single-circuit. Cables can enter either from above or below.
 2. Install one BFTFM (14*c*) adjacent to the rear of the OFR. Each BFTFM can typically accommodate 384 individual BF tubes, the equivalent of 4×96 fibre cables. A second and third BFTFM can be added to the flexibility suite to accommodate typically 1152 individual BF tubes.

3. Install the vertical cable tray (20), the mandrel adapter (22) and the internal bend mandrel (24). The mandrels positively manage the fibre tube bend to prevent overbending. In this instance the cable routes upwards.

Installing Subsequent Secondary Flexibility Suite (e.g. 14*a* and 14*b* of FIG. 3)

4. Install vertical cable tray (26), support-frame uprights (28) and frame strap (30) on exchange floor.
5. Add the outer bend mandrel (32) and the line-side BFTFM (14*b*).
6. Install a second vertical cable tray (26), equipment-side BFTFM (14*a*), mandrel adapter and internal bend mandrel.

The secondary flexibility suite is now ready to accept BF tubing. The installation shown can accommodate up to 384 BF patch tubes.

Installing BF Tubing

7. The butt of the BF tube (16) is cut level with the edge of the BFTFM (14). Each tube contained is routed over the plastic tube mandrels so that its bend radius is controlled. Tubes are then cut to length and plugged into the push-fit bulkhead fittings which are in turn located into the appropriate hole in the patch panel.
8. An illustration of interface with the vertical cable tray—upwards.
9. An illustration of interface with the vertical cable tray—downwards.

Figure 10:
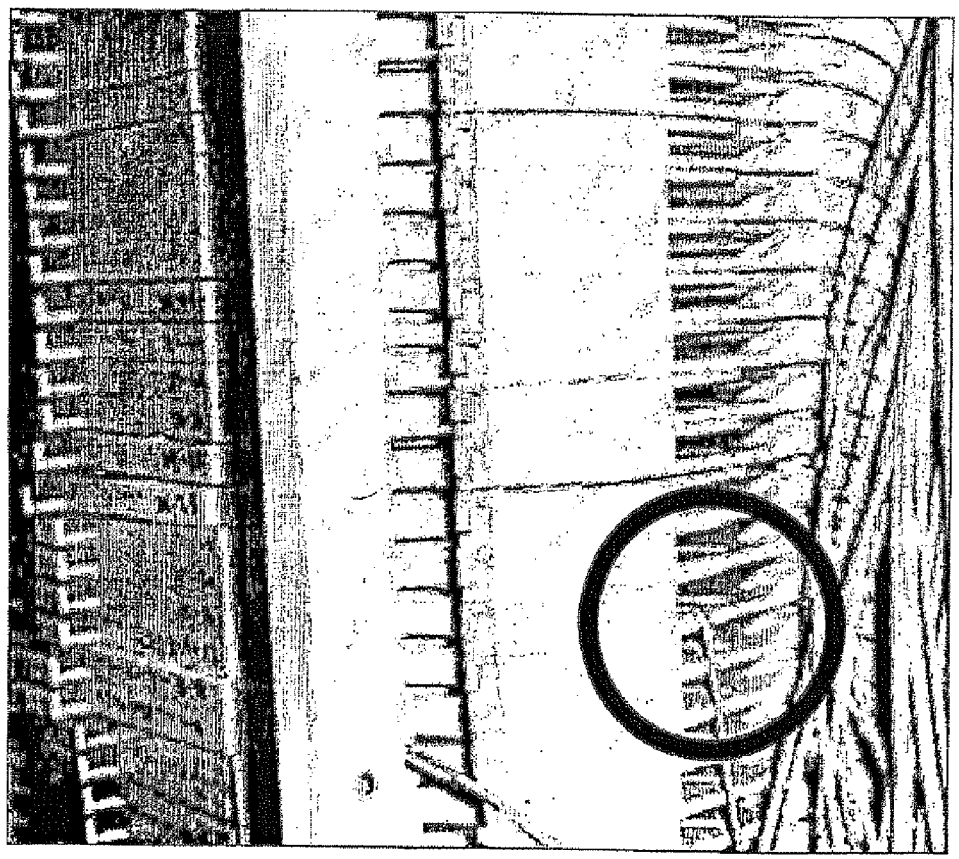
FIG. 10 shows an instance of cable deployment in an exchange according to current methods.

We turn now to FIGS. 10 and 11 which help explain the use of positive bend management in the context of a telecommunications exchange. As noted above, this technique addresses problems arising from bending a fibre at a radius smaller than its minimum permissible bend radius. As is well known, bending an optical fibre too tightly is likely to result in significant optical losses and/or mechanical fibre damage. Bundles of optical fibre have larger minimum permissible bend radii than those of their constituent fibres. Controlling and managing the fibre bend (as opposed to simply allowing the fibre to find its own path from flexibility suite to flexibility suite) helps prevent optical tubes or fibres from being kinked or bent to a tight radius which may impede blown fibre installation and/or optimal fibre performance. The fibre could be confined within a prescribed path, or simply guided along a curve describing an ideal radius that could be at or near the minimum permissible bend limit.

This characteristic of optical fibre is a particular problem in large telecommunications exchanges. By way of example, British Telecommunications plc has to date more than 4,000 exchanges throughout the United Kingdom, of which some 200 serve over 20,000 customers each. The largest exchanges have multiple floors, hundreds of equipment racks and a very high number of fibre and copper cables routed around and throughout the exchange building. As time progresses, the exchange becomes more heavily populated and changes to equipment, customer needs etc., necessitate re-routing and re-termination of cables. It has been found that the routes taken by cables, if uncontrolled, may impair the performance of the optical fibre. For example, if a jumper cable is re-used it will have to be cut and re-connected—very often it may be too short to reach easily between the two sides and may have to be stretched tight thus compromising minimum bend radius dimensions, as shown in FIG. 10. This of course affects fibre and circuit performance, but is a common occurrence in exchanges owing to changes in the needs of the customers served by the exchange, e.g. equipment upgrades requiring cable path changes, and growth in numbers of cables populating the exchange.

FIG. 11 shows the BFTFMs discussed in connection with FIG. 9 above, and illustrates how the technique of positive tube bend management may be used. FIGS. 11A and 11B show where cable bend can be controlled and managed (40) in a typical BFTFM set-up.

Tube bend management apparatus can take the form of curved guides or mandrels—(e.g., 24 in FIGS. 9A-I)—around or against which the tubes are wrapped. The degree of curve depends on the exact type of cable tube being used but in the UK this would typically be a radius of about 50 mm.

Figure 11C:
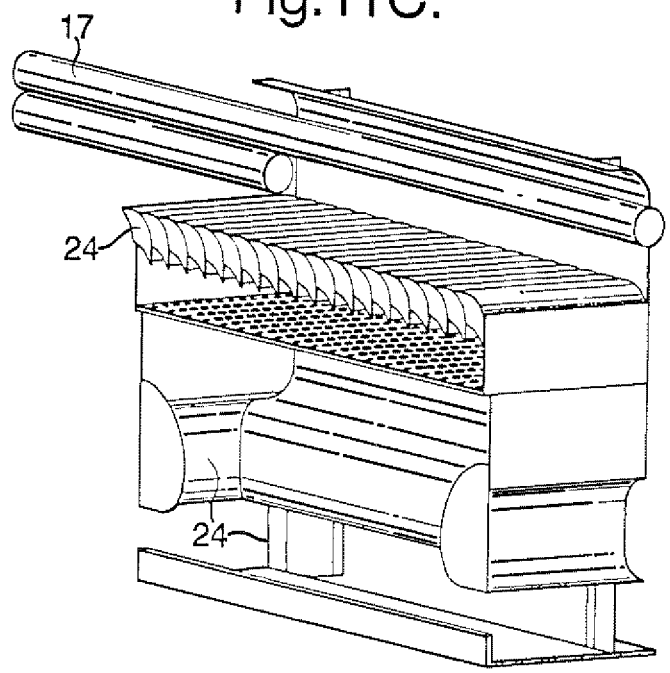
Figure 11D:
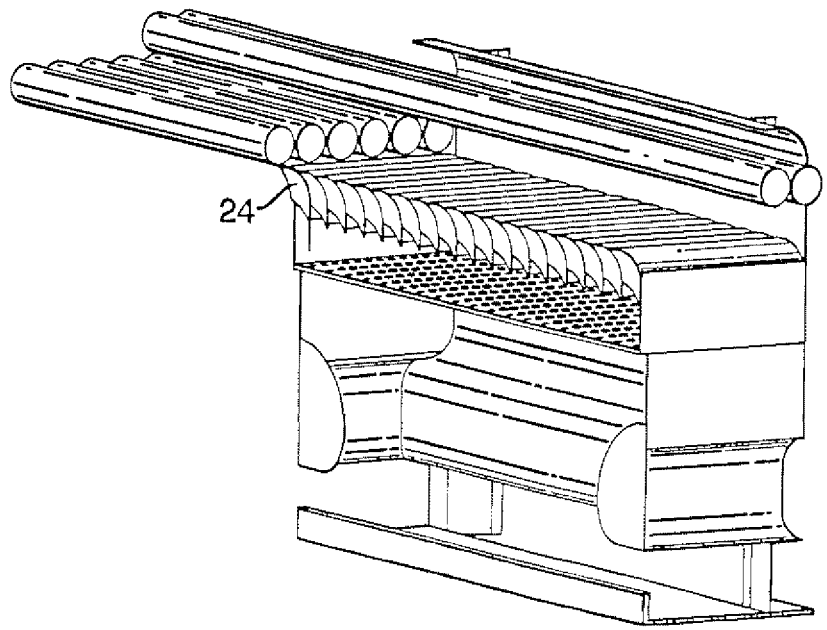

FIGS. 11C and 11D show where and how tubes (16) can be subject to positive tube bend management in a BFTFM of the type discussed in connection with FIG. 9. The bend control mandrels (24) allow the optical fibre (16) to be guided in a controlled manner around a curve of a radius suitable for it, preventing overly tight cable routing.

Figure 12:
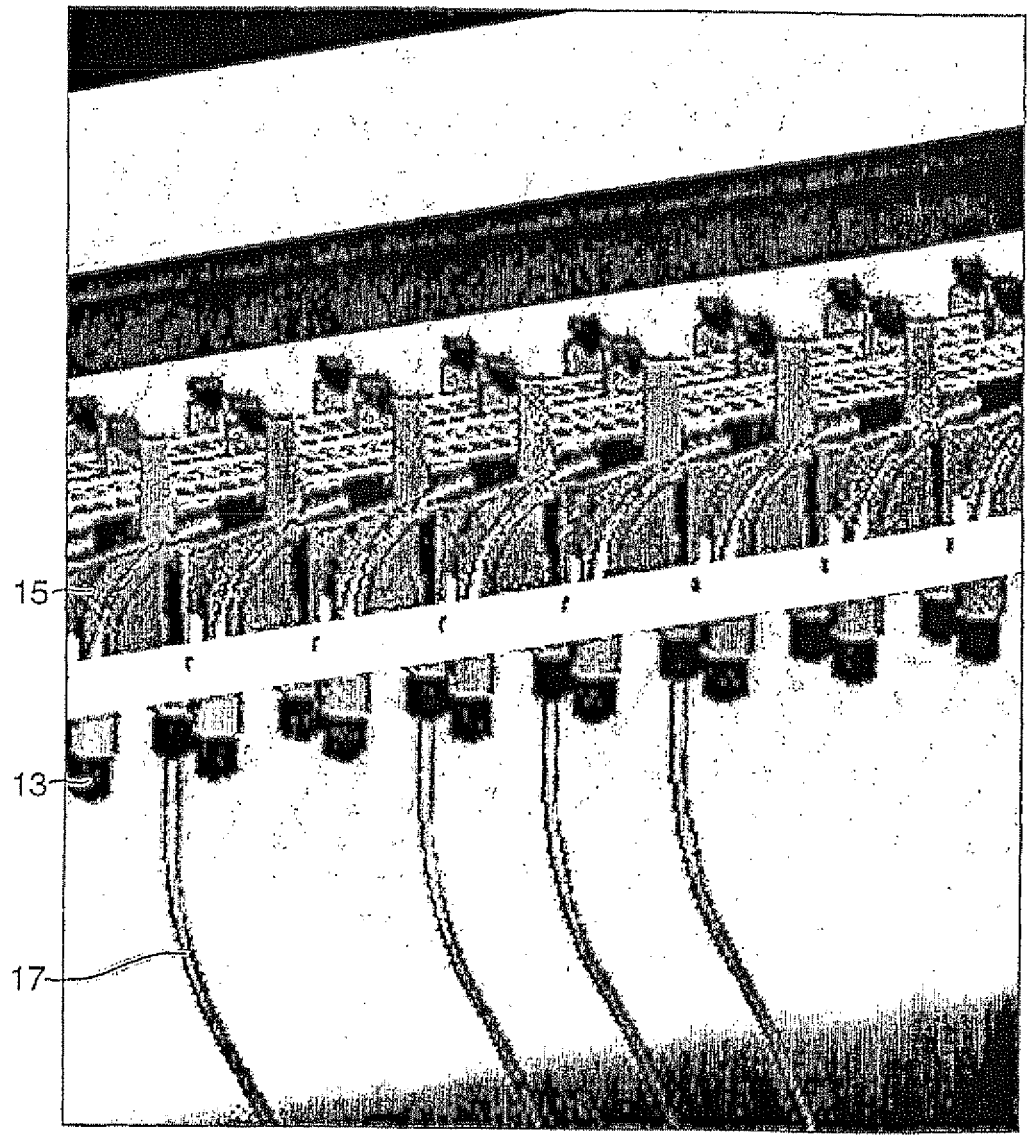
FIG. 12 provides a close up view of the patching means within the BFTFMs.

FIG. 12 provides details of one application of positive tube bend management on the BFTFM. On the right side of this figure is a close-up view of an embodiment of a patching unit on a patching panel (11). Other means for controlling fibre bend radius include the use of bend limiting tube (or bend-limiting boots on an ordinary tube); selection of tube sheath materials (i.e. using stiffer or more rigid materials); and thicknesses can which discourage excessive bend (i.e. using wall thicknesses which at the lengths typically used for patching are much less likely to be bent at a radius which represents an excessive bend); and so on. In this embodiment, guides (15) are positioned on or next to the tube connectors to accommodate and control the bend radius of tube and fibre passing through the receivers. These help to prevent the type of overbend depicted in FIG. 10.

Figure 13:
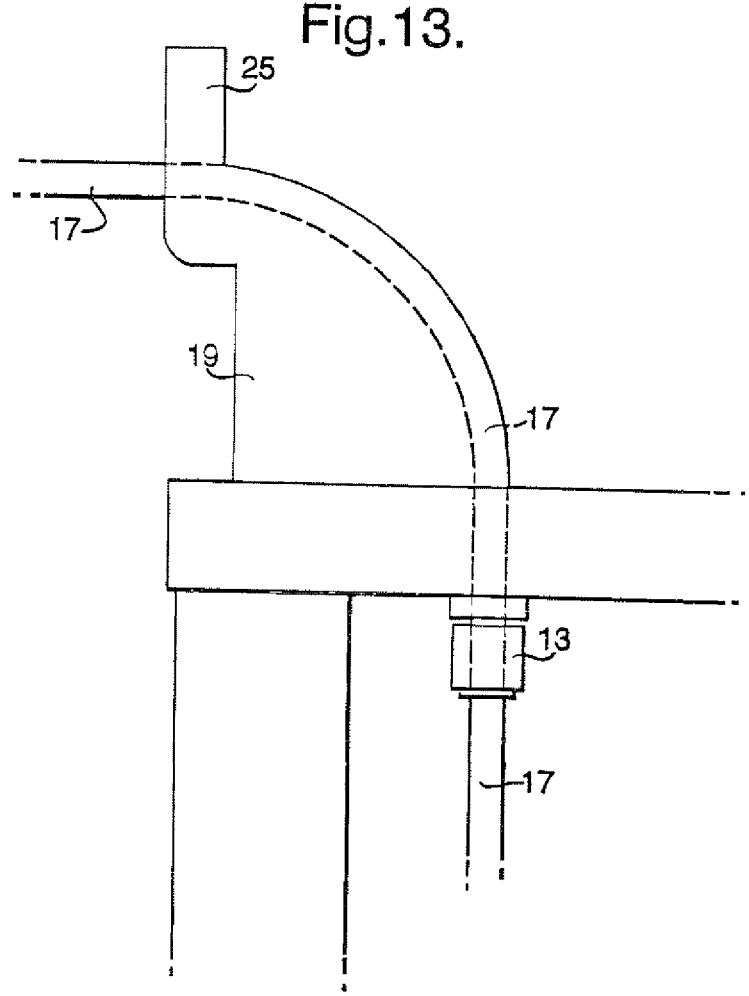
FIG. 13 depicts another, more preferred embodiment of the patching means.

FIG. 13 depicts another, preferred embodiment of the patching unit of the invention, as mounted onto a BFTFM. In this embodiment, the unit comprises two main parts, the first being a connector body (19) configured to receive a BFT (17) entering (or exiting) the module, and the second being the tube connector (13) fitted to the body. The connector body includes a channel shaped and functioning as a guide (15) to prevent BFT and fibre overbend. As in the case of the patching unit depicted in FIG. 12, BFTs are push-fit on the tube connectors (13). The tube connector is fixed to the connector body (19), and only one of the two receiving portions (21) is visible in this FIG. 13.

Figure 14:
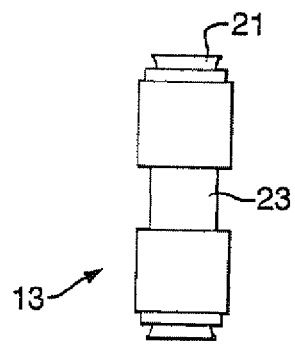
FIG. 14 depicts details of a tube connector used with the patching means of FIG. 13.

The tube connector is shown unfixed from the rest of the patching unit and further detailed in FIG. 14. It essentially comprises a connector tube (23) with two receiving portions (21), one each on opposite ends of the connector tube.

Figure 15:
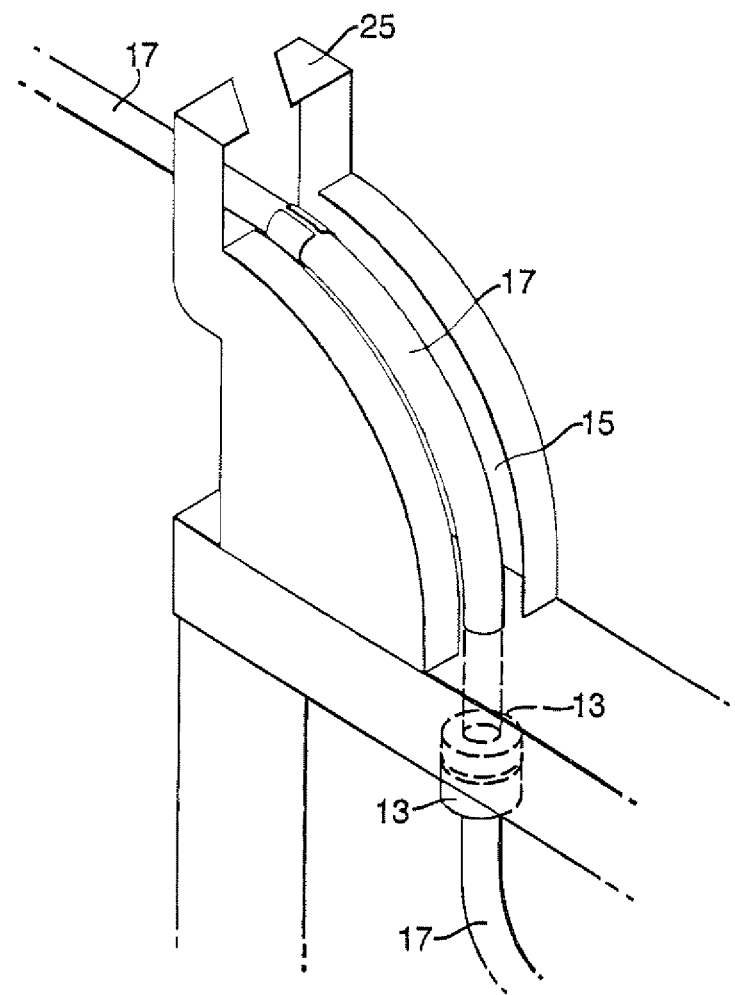
FIG. 15 is another view of the patching means of FIG. 13 mounted in a BFTFM.

When installed on the BFTFM, the patching units form a matrix on the patching panel (11) allowing a user to create a tubular path between two BFTFMs, and thus in the broader context of the exchange, to form part of the tubular path between the incoming cable (5) and the destination equipment rack (2). Another view of this embodiment of the patching unit is shown in FIG. 15, which show the patching unit mounted on a BFTFM, and the part of the path taken by the BFT (17) through the tube connector (13). As noted above e.g. in connection with FIG. 8*a* the tubes in the present embodiment are connected on the patch panel in a push-fit arrangement. While push fit connectors are very convenient to use, clamped or screw-down connectors could be used as could, for example, gluing or welding to fix and seal the tubes to the patch panels although such permanent or semi-permanent would compromise the re-routing flexibility which the invention potentially provides.

FIG. 15 shows the patching unit sitting in a position provided for it in the patch panel of the BFTFM so that its arms (25) point upwards, and the tube connector (13) downwards. As noted above in connection with FIG. 8, up to 266 such patching units (19 across and 14 deep in one patching panel) can be accommodated in the embodiment of the BFTFM under discussion. A BFT ultimately leading from or to the incoming cable (5) or the equipment rack (2) is positioned so that it lies on the connector body between the connector arms. The channel acting as a guide (15) leads the BFT to the tube connector (13) and prevents cable overbend. The BFT is push-fit onto the receiving portion (21) of the tube connector (13) located at the end of the channel (not visible from the drawings). The other tube connector on the opposite end of the connector unit may simultaneously or separately receive another length of BFT to continue the tubular path away or from the BFTFM.

Although the foregoing discussion concerns mainly a connection created by the invention between an equipment rack and an incoming cable connecting the exchange to the external telecommunications network, the skilled person would easily recognise that the invention can be deployed with similar effects or advantages to connect any other originating point to any destination point within or outside of the exchange. Furthermore, while the specific description is made in the context of telecommunication exchange buildings, it would be clear that the invention can have applications in any other environment where blown fibre technology according to the invention can be used in place of conventional connectorised and/or spliced optical fibre or current BFT management practices. In particular, the invention may be used in a Local Area Network (LAN) environment.

The skilled person would also appreciate that the invention is not limited to use in a new set-up ready to be cabled, nor to one which is already cabled in a manner as described herein. The inventive aspect concerning re-routing of optical paths, in particular, can be applied even in a conventional installation, to gradually migrate the inventive method into such convention set-ups. The benefits of using the invention can be realised even in such applications.

What is claimed is:

1. A flexibility suite for routing an optical fibre within a telecommunications switch installation, the suite comprising:
   a first patch panel comprising a first row of conduits,
   a second patch panel comprising a second row of conduits,
   optical fibre bend control unit having an axis along which the bend control unit co-extends with the first and the second rows of conduits, and the optical fibre bend control unit having a configuration to control bend of the optical fibre so that the optical fibre is bent,
   wherein a continuous tubular blown fibre path, configured for subsequent blown installation of the optical fibre, controlled by the bend control unit is formed between the first patch panel and the second patch panel by using a patch tube to connect any conduit of the first patch panel to any conduit of the second patch panel, and
   wherein the patch tube terminates at each of its ends connected to the conduits.

2. A flexibility suite as in claim 1 wherein at least one of the first patch panel or the second patch panel comprises more than one row of conduits.

3. A flexibility suite as in claim 1 wherein at least one of the conduits is provided with a connector for connection by the patch tube.

4. A flexibility suite as in claim 1 wherein the bend control unit is sited between the first patch panel and the second patch panel.

5. A flexibility suite as in claim 1 comprising:
   a first flexibility point including a first patch panel and bend control unit having a first curved face, and
   a second-flexibility point including a second patch panel and bend control unit having a second curved face.

6. A flexibility suite as in claim 5 wherein the first flexibility point is non-unitary with the second flexibility point.

7. A flexibility suite as in claim 5 comprising more than two flexibility points.

8. A flexibility suite as in claim 1 wherein:
   at least one conduit of the first row comprises a first conduit end and a second conduit end, and
   at least one conduit of the second row comprises a third conduit end and a fourth conduit end,
   the tubular blown fibre path being formed by connecting a first end of the patch tube to the second conduit end and connecting a second end of the patch tube to the third conduit end.

9. A flexibility suite as in claim 8 wherein:
   a first optical fibre tube is connected to the first conduit end, and
   a second optical fibre tube is connected to the fourth conduit end,
   the tubular blown fibre path being formed to extend beyond conduits of the first or the second patch panel.

10. A flexibility suite as in claim 9 further including bend management unit to manage the bend radius of at least one of the first or the second optical fibre tubes.

11. A flexibility suite for routing an optical fibre within a telecommunications switch installation, the suite comprising:
    a flexibility point including a patch panel having a row of conduits and optical fibre bend control unit having an axis along which the bend control unit co-extends with the row of conduits, and splicing unit, and the optical fibre bend control unit having a configuration to control bend of the optical fibre so that the optical fibre is bent,
    wherein a continuous tubular blown fibre path, configured for subsequent blown installation of the optical fibre, is controlled by the bend control unit formed between the patch panel and the splicing unit by using a patch tube to connect a selected conduit of the patch panel to the splicing unit; and
    wherein the patch tube terminates at each of its ends connected to the selected conduit and to a conduit of another patch panel.

12. A flexibility suite installation comprising a plurality of flexibility suites according to claim 1.

13. A telecommunications switch or router installation comprising:
    a telecommunications switch or router,
    a first flexibility suite, and
    a second flexibility suite,
    wherein each of the first and second flexibility suites comprise:
    a first patch panel comprising a first row of conduits,
    a second patch panel comprising a second row of conduits,
    optical fibre bend control unit having an axis along which the bend control unit co-extends with the first and the second rows of conduits, and the optical fibre bend control unit having a configuration to control bend of the optical fibre so that the optical fibre is bent,
    wherein a continuous tubular blown, fibre path, configured for subsequent blown installation of the optical fibre, controlled by the bend control unit is formed between the first patch panel and the second patch panel by using a patch tube to connect any conduit of the first patch panel to any conduit of the second patch panel, wherein the continuous tubular path is formed from the first flexibility suite to the second flexibility suite,
the tubular blown fibre path being formed by:
(a) a patch tube connecting a conduit of the first patch panel to a conduit of the second patch panel within the first flexibility suite,
(b) a patch tube connecting a conduit of the first patch panel to a conduit of the second patch panel within the second flexibility suite, and
(c) at least one optical fibre tube connecting conduits between the first and the second flexibility suite,
wherein an optical fibre can be installed along the tubular blown fibre path so formed; and
wherein the patch tube terminates at each of its ends connected to the conduits.

14. An installation according to claim 13 further including at least one subsequent flexibility suite which comprises:
a first patch panel comprising a first row of conduits,
a second patch panel comprising a second row of conduits,
optical fibre bend control unit having an axis along which the bend control unit co-extends with the first and the second rows of conduits,
wherein the continuous tubular blown fibre path controlled by the bend control unit is formed between the first patch panel and the second patch panel by using a patch tube to connect any conduit of the first patch panel to any conduit of the second patch panel, wherein:
the first flexibility suite is connected to a subsequent flexibility suite in series via the second flexibility suite using optical fibre tubes, so that the tubular blown fibre path is formed from the first flexibility suite to a subsequent last flexibility suite in the series.

15. A telecommunications switch or router installation comprising:
a telecommunications switch or router,
an external optical fibre of a telecommunications network,
a primary flexibility suite, and
at least one secondary flexibility suite comprising:
wherein each of the primary and at least one secondary flexibility suites comprise:
a first patch panel comprising a first row of conduits,
a second patch panel comprising a second row of conduits,
optical fibre bend control unit having an axis along which the bend control unit co-extends with the first and the second rows of conduits, and the optical fibre bend control unit having a configuration to control bend of the optical fibre so that the optical fibre is bent,
wherein a continuous tubular blown fibre path, configured for subsequent blown installation of the optical fibre, controlled by the bend control unit is formed between the first patch panel and the second patch panel by using a patch tube to connect any conduit of the first patch panel to any conduit of the second patch panel,
wherein the tubular path is formed from the primary flexibility suite to the telecommunications switch or router via each secondary flexibility suite in series, the tubular blown fibre path being formed by:
(a) a patch tube connecting a conduit of the first patch panel to either a conduit of the second patch panel or to the splicing unit within the primary flexibility suite,
(b) a patch tube connecting a conduit of the first patch panel to a conduit of the second patch panel within each secondary flexibility suite, and
(c) at least one optical fibre tube connecting conduits between flexibility suites, wherein an optical fibre can be installed along the tubular blown fibre path so formed to optically connect the switch or router to the external optical fibre; and
wherein the patch tube terminates at each of its ends connected to the conduits.

16. An installation as in claim 15 wherein a plurality of telecommunications switches or routers are connected, via the primary and secondary flexibility suite, to several external optical fibres.

17. An installation according to claim 13 wherein the flexibility suites are disposed on different floors of a building housing the installation.

18. A first patch panel suitable for use with a second patch panel, the first patch panel comprising:
a row of conduits,
optical fibre bend control unit having an axis along which the bend control unit co-extends with the row of conduits, and the optical fibre bend control unit having a configuration to control bend of the optical fibre so that the optical fibre is bent,
wherein a continuous tubular blown fibre path, configured for subsequent blown installation of the optical fibre, controlled in bend radius by the bend control unit is formed between the first patch panel and the second patch panel by using a patch tube to connect a conduit of the first patch panel to a conduit of the second patch panel; and
wherein the tube terminates at each of its ends connected to the conduits.

19. A method of creating a connection in a telecommunications switch or router installation, between a telecommunications switch or router, and an external optical fibre of a telecommunications network said method comprising:
installing lengths of patch tube and optical fibre tube and joining ends of the lengths of patch tube and optical fibre tube to form a continuous
tubular blown fibre path from a primary flexibility suite to the switch or router via a secondary flexibility suite and
installing, by blowing, a continuous optical fibre through the tubular blown fibre path to optically connect the switch or router and the optical fibre of the external cable; and
wherein the patch tube terminates at each of its ends connected to conduits of the primary and secondary flexibility suites.

20. A method of re-routing an existing connection in a telecommunications switch or router installation, from a connection between a first telecommunications switch or router and an external optical fibre of a telecommunications network via a primary flexibility suite to create a connection between a second telecommunications switch or router and the external optical fibre via the primary flexibility suite, said method comprising:
breaking connections between the first switch or router and the primary flexibility suite
joining ends of lengths of patch tube and optical fibre tube to form a continuous tubular blown fibre path from the primary flexibility suite to the second switch or router via a secondary flexibility suite, and
installing, by blowing, a continuous optical fibre through the tubular blown fibre path formed by the joined patch tubes and optical fibre tubes thereby providing an optical path between the second switch or router and the external optical fibre; and
wherein the patch tube terminates at each of its ends connected to conduits of the primary and secondary flexibility suites.

21. A method as in claim 19 wherein the continuous optical fibre is pre-connectorized.

22. A method as in claim 19 wherein the continuous optical fibre is installed from an equipment rack housing the switch or router to the primary flexibility suite.

23. A method as in claim 19 wherein the continuous optical fibre is installed form the primary flexibility suite to the switch or router.

24. A flexibility suite as in claim 1 wherein the continuous tubular blown fibre path has a continuous configuration between the first and second patch panels such that a continuous optical fiber is installed in the continuous tubular blown fibre path.

* * * * *